(12) United States Patent
Amos et al.

(10) Patent No.: US 8,214,918 B2
(45) Date of Patent: Jul. 3, 2012

(54) PROBES FOR ENHANCED MAGNETIC FORCE MICROSCOPY RESOLUTION

(75) Inventors: Nissim Amos, Moreno Valley, CA (US); Sakhrat Khizroev, Riverside, CA (US); Rabee Ikkawi, Pembroke Pines, FL (US); Robert Haddon, Riverside, CA (US); Robert Fernandez, Brawley, CA (US)

(73) Assignee: The Regents of the University of California, Oakland, CA (US)

( * ) Notice: Subject to any disclaimer, the term of this patent is extended or adjusted under 35 U.S.C. 154(b) by 199 days.

(21) Appl. No.: 12/623,329

(22) Filed: Nov. 20, 2009

(65) Prior Publication Data

US 2010/0138964 A1    Jun. 3, 2010

Related U.S. Application Data

(60) Provisional application No. 61/118,399, filed on Nov. 26, 2008, provisional application No. 61/248,998, filed on Oct. 6, 2009.

(51) Int. Cl.
*G01Q 60/56* (2010.01)
(52) U.S. Cl. ........................................................ 850/49
(58) Field of Classification Search .................. 850/48, 850/49; 324/244
See application file for complete search history.

(56) References Cited

U.S. PATENT DOCUMENTS

| | | | | |
|---|---|---|---|---|
| 5,171,992 A * | 12/1992 | Clabes et al. | ............... | 850/58 |
| 5,611,942 A * | 3/1997 | Mitsui et al. | ............... | 216/67 |
| 6,121,771 A * | 9/2000 | Moser | ............... | 324/244 |
| 6,448,765 B1 * | 9/2002 | Chen et al. | ............... | 324/244 |
| 6,668,628 B2 * | 12/2003 | Hantschel et al. | ............... | 73/105 |
| 7,056,446 B2 * | 6/2006 | Nagase et al. | ............... | 216/57 |
| 2003/0102863 A1 * | 6/2003 | Wu | ............... | 324/244 |

* cited by examiner

*Primary Examiner* — Jack Berman
(74) *Attorney, Agent, or Firm* — Knobbe, Martens, Olson & Bear, LLP

(57) ABSTRACT

Magnetic Force Microscopy (MFM) probe tips that provide enhanced spatial resolution and methods of manufacture are provided. In one aspect, two or more magnetically-decoupled layers may be deposited on an AFM probe in order to create an active magnetic region at about the apex of the probe tip with dimensions less than about 10 nanometers. In another aspect, nanoscale patterning techniques may be employed to fabricate probe tips that possess plateau features. These plateau features may serve as substrates for the deposition of magnetic films having properties similar to magnetic recording media. Machining techniques, such as Focused Ion Beam (FIB) may be further employed to reduce the size of the magnetic materials deposited upon the substrate. Beneficially, because the plateaus of the substrate are substantially flat and of known geometry, and the magnetic properties of magnetic films deposited on flat surfaces are similar to those deposited upon the plateau, the magnetization of the MFM probe tips may be determined to high accuracy. In this manner, fine control over the magnetic properties of MFM probe tips may be achieved, providing enhanced MFM resolution.

39 Claims, 30 Drawing Sheets

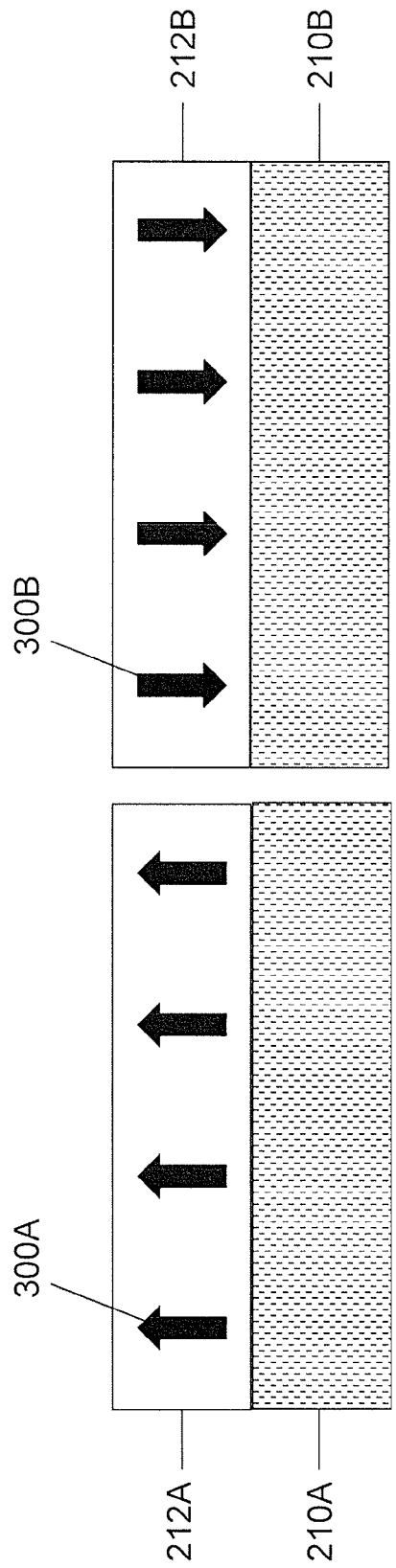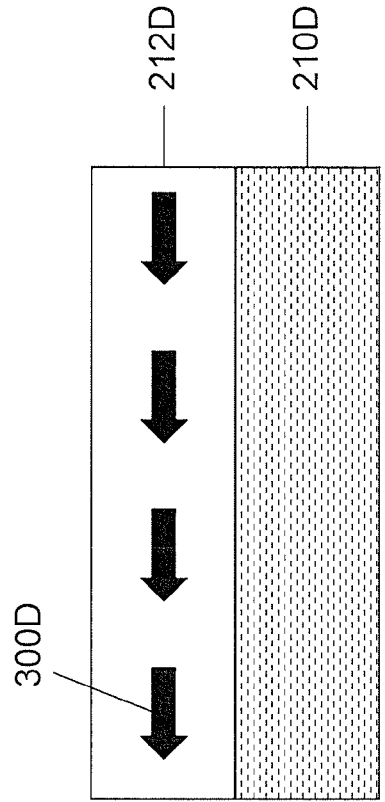

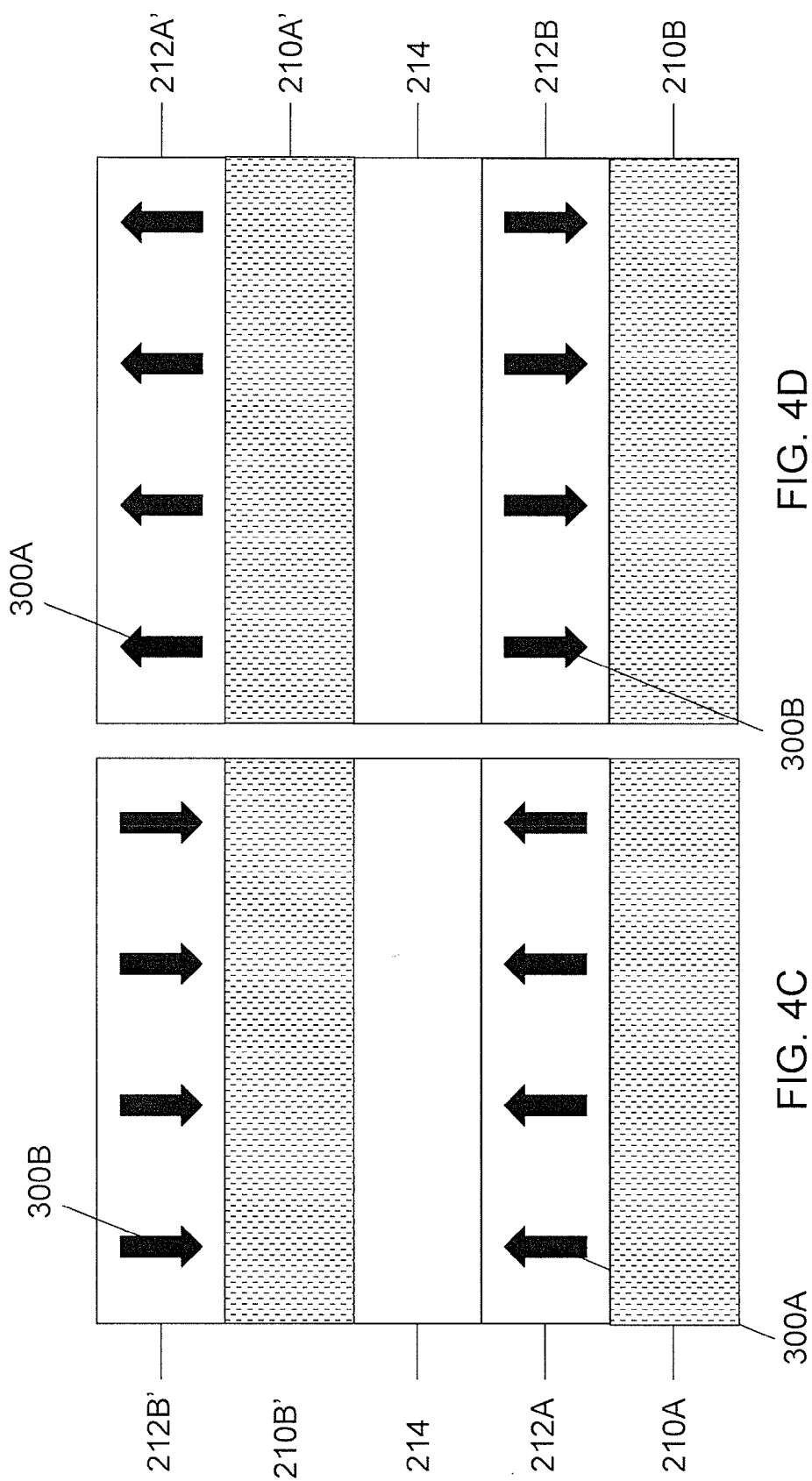

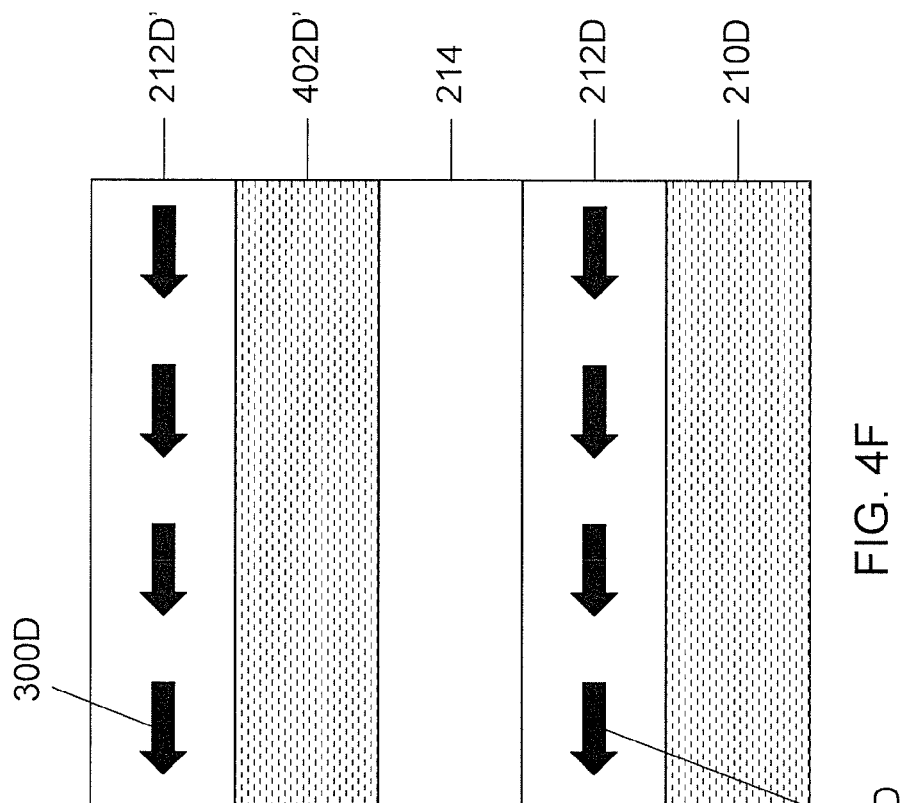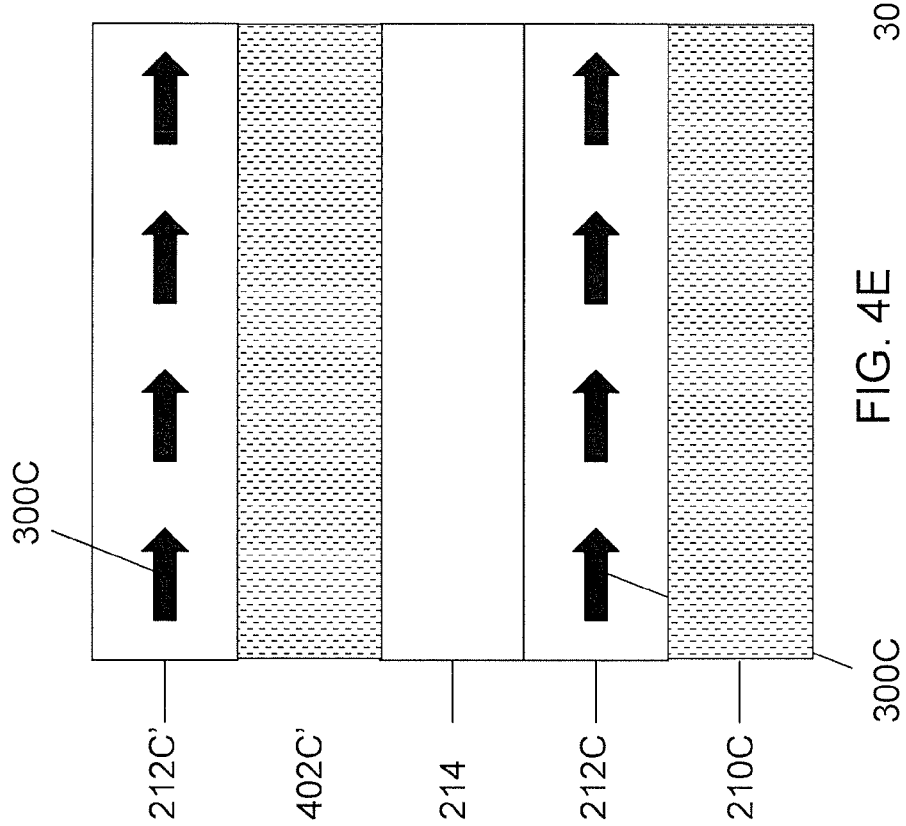

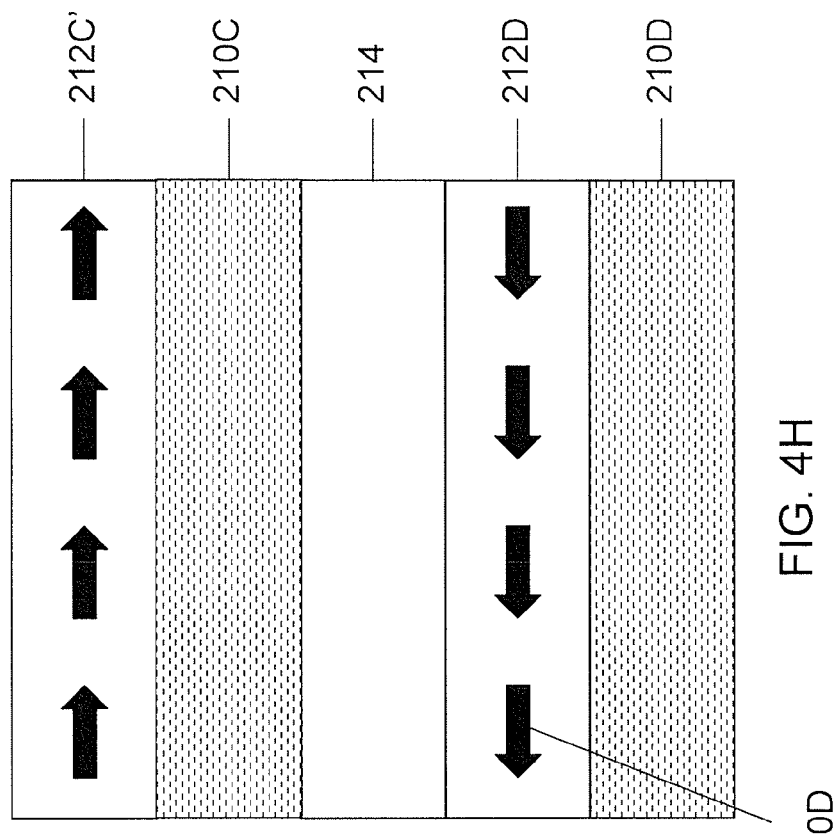
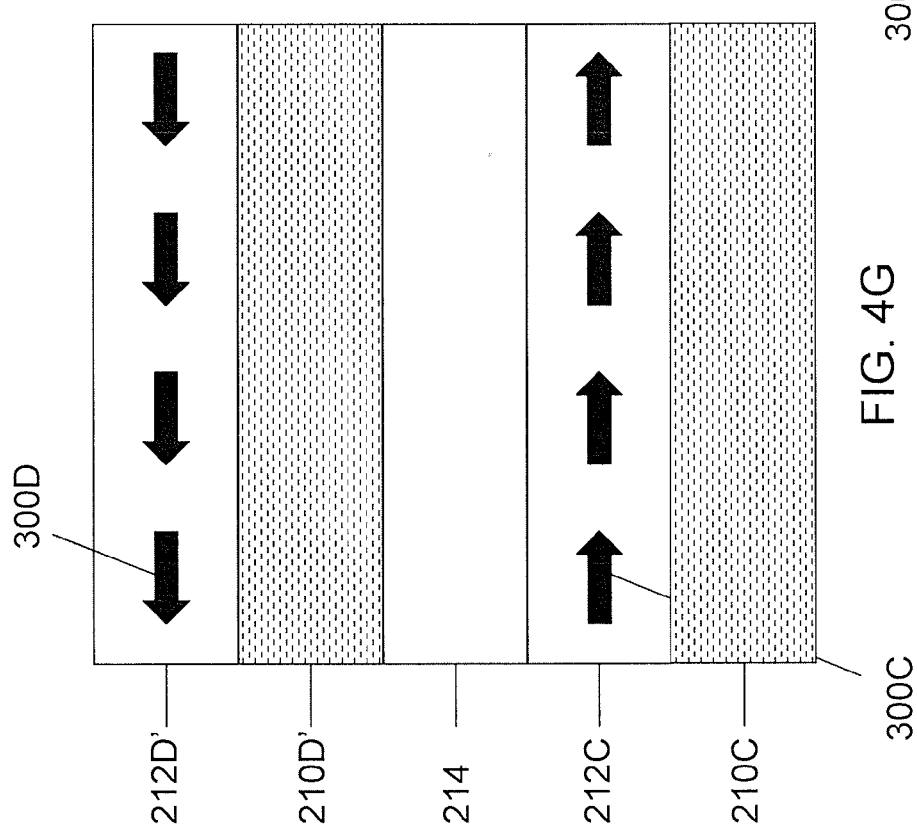

Side View

Top View

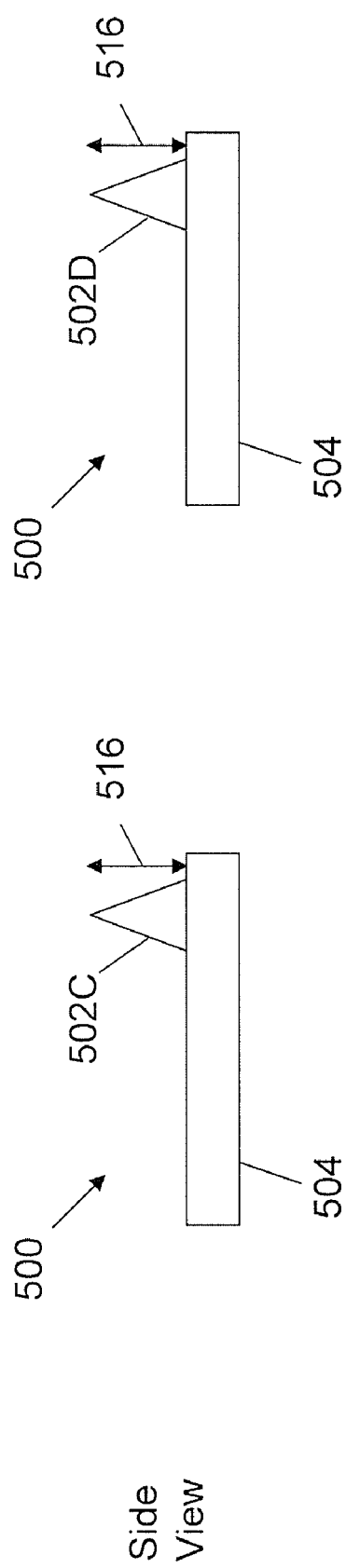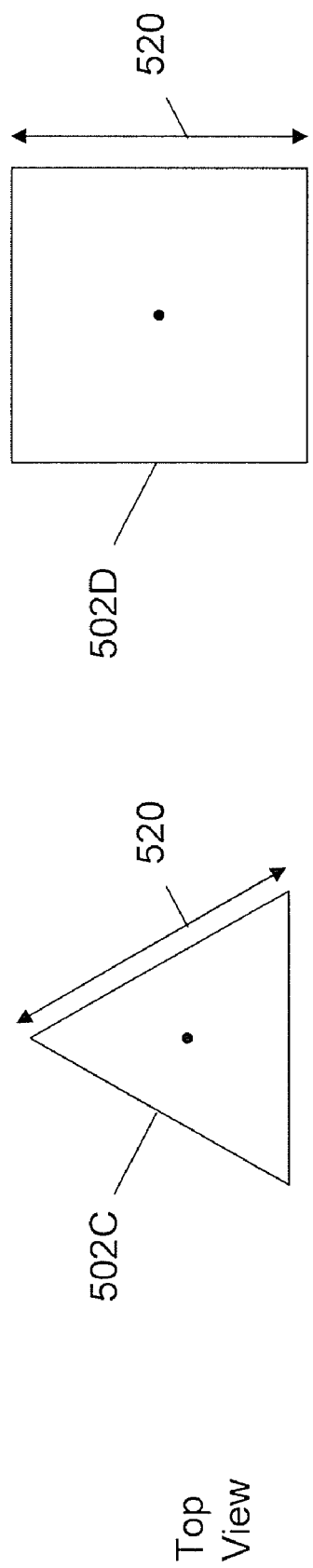

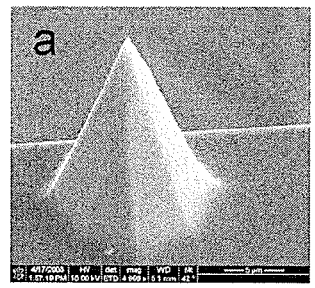
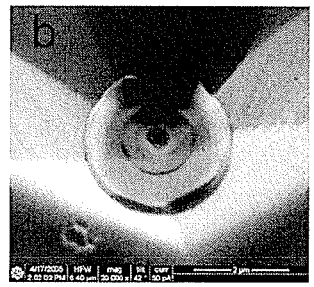
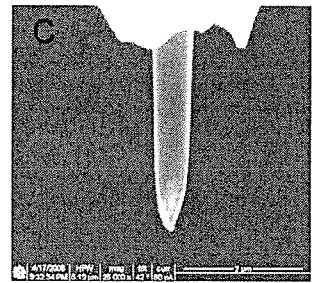
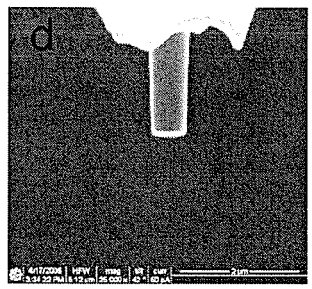
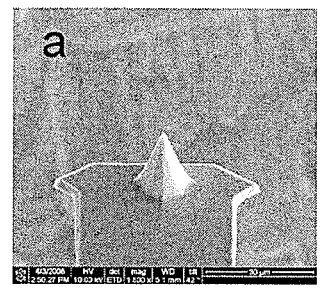
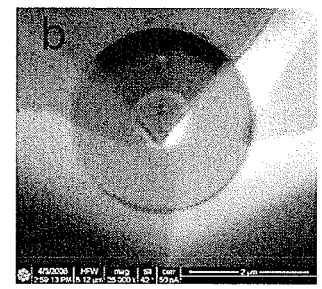
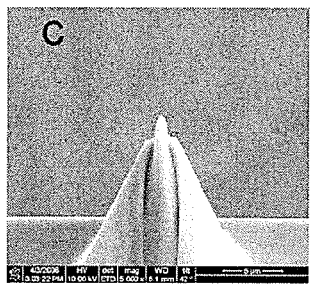
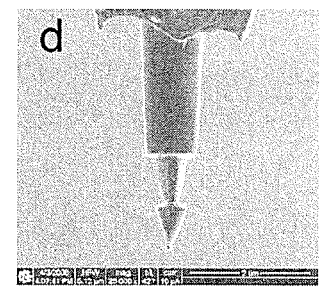
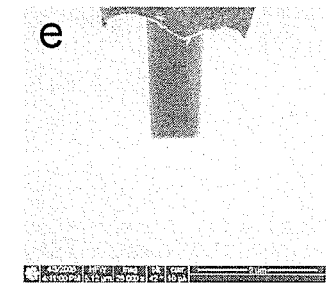
FIG. 14          FIG. 15

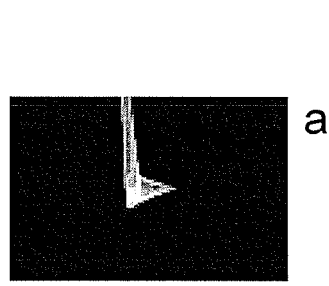
a
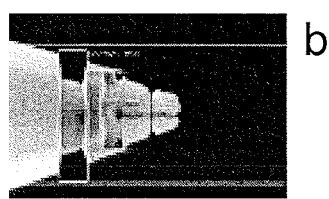
b
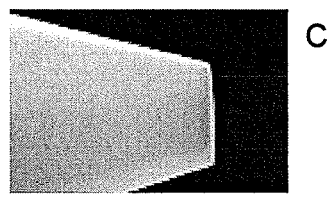
c
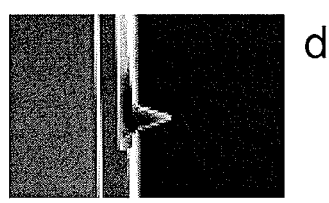
d
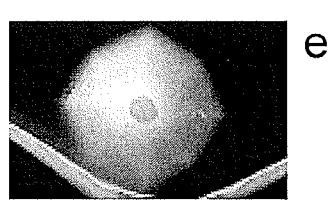
e
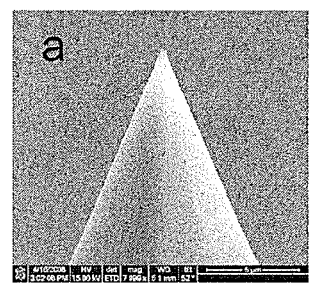
a
b
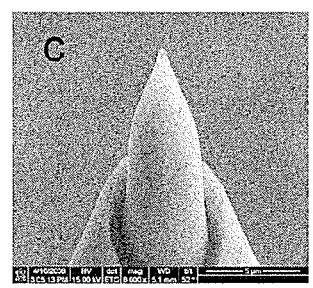
c
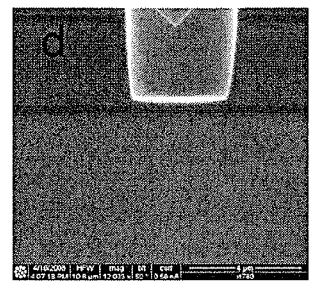
d
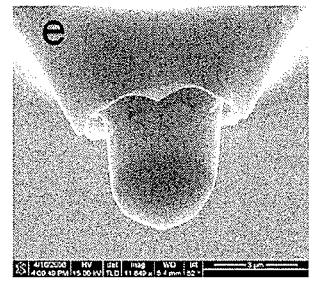
e
FIG. 16           FIG. 17

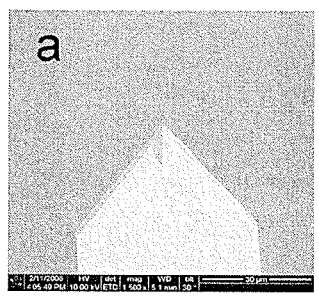
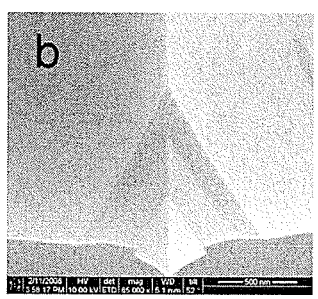
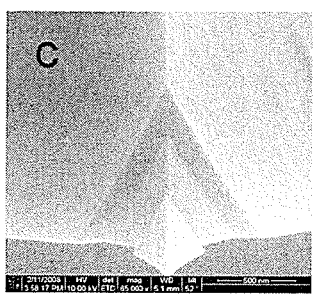
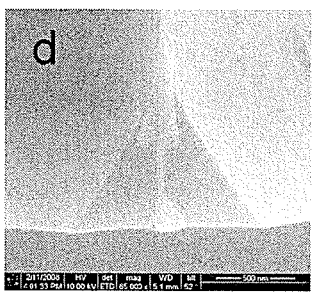
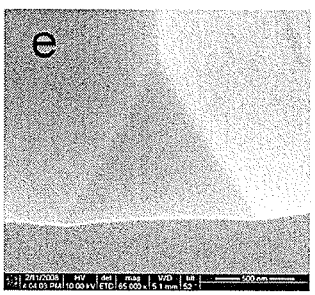
FIG. 18

PROBES FOR ENHANCED MAGNETIC FORCE MICROSCOPY RESOLUTION

CROSS-REFERENCE TO RELATED APPLICATIONS

This application claims the benefit of priority under 35 U.S.C. §119(e) of U.S. Provisional Application No. 61/118,399, filed on Nov. 26, 2008 and entitled, "PLATEAU PROBES FOR ENHANCED MAGNETIC FORCE MICROSCOPY," and U.S. Provisional Patent Application No. 61/248,998, filed on Oct. 6, 2009 and entitled, "MAGNETIC FORCE MICROSCOPY WITH SUB-10-nm RESOLUTION UNDER AMBIENT CONDITIONS." The entirety of each of these applications is incorporated herein by reference.

STATEMENT REGARDING FEDERALLY SPONSORED R&D

This invention was made with Government support under Contract Numbers H94003-07-2-0703, awarded by the Air Force Office of Scientific Research (AFOSR) and Grant No. 0712445 awarded by the National Science Foundation. The Government has certain rights in this invention.

BACKGROUND

1. Field

Embodiments of the present disclosure pertain to imaging technologies and, in particular, to high resolution magnetic force microscopy.

2. Description of the Related Art

As technologies increasingly operate at nanoscale dimensions, the significance of high resolution microscopy has increased. Scanning probe microscopy (SPM) is recognized as an important technique for surface measurements at high resolution (e.g., nanoscale accuracy).

Magnetic force microscopy (MFM) is a mode of SPM that has been developed to measure the magnetic properties of a sample. In MFM, a separation distance of about 15-20 nm is maintained between a probe tip and a sample, which each comprise magnetic materials. By scanning the MFM probe tip over the sample surface, long-range magnetic interactions between the tip and surface may be measured.

Today, the span of MFM applications is truly diverse. Applications may include, but are not limited to, analysis of secret information by the FBI, magnetization distribution in systems such as recording media, magnetostatic bacteria, and other systems containing magnetic materials. In particular, MFM is extensively used in the data storage industry to measure magnetization distributions in recording media and heads and, therefore, is instrumental in devising new ways to add more data into a recording systems.

However, the spatial resolution of conventional MFM under ambient conditions, on the order of 20-25 nm in air, is an order of magnitude worse than the resolution of atomic force microscopy (AFM), about 2-3 nm, and roughly two orders of magnitude worse than the resolution of scanning tunneling microscopy (STM), which has a resolution on the order of a few angstroms. Further, the average grain size in newly developed magnetic recording media is less than the spatial resolution of present MFM systems. Thus, in order for MFM to effectively analyze new magnetic recording media, it is desirable that improvements in the spatial resolution of MFM systems keep pace with the size of these media.

SUMMARY

In an embodiment, a method of manufacturing a magnetic force microscopy (MFM) probe tip is provided. The method comprises introducing a plateau region into a first end of a generally elongate substrate in a first plurality of patterning operations. The method further comprises depositing a magnetic material comprising a magnetic layer upon at least a portion of the plateau region of the MFM probe tip substrate. The method additionally comprises patterning the magnetic material in a second plurality of patterning operations.

In another embodiment, a magnetic force microscopy (MFM) probe tip is provided. The MFM probe tip comprises a generally elongate body having a first end and a second end, the second end having a plateau configuration with respect to the body. The probe tip further comprises a magnetic material positioned upon the plateau at the second end of the body. The magnetic material comprises a plurality of magnetic layers and at least one non-magnetic layer interposed between at least one pair of the plurality of magnetic layers.

In a further embodiment, a magnetic force microscopy (MFM) probe tip is provided. The probe tip comprises a substrate comprising an atomic force microscopy (AFM) tip. The probe tip further comprises a magnetic material positioned upon at least a portion of the substrate. The magnetic material comprising at least two magnetic layers and at least one non-magnetic layer interposed between at least one pair of the plurality of magnetic layers. The magnetic flux in the at least two layers is configured so as to substantially cancel except within an active magnetic region having a selected dimension.

BRIEF DESCRIPTION OF THE DRAWINGS

FIGS. 3A-3D are schematic illustrations of embodiments of magnetization configurations that may be adopted by the magnetic materials of FIG. 2;

FIGS. 4A-4H are schematic illustrations of embodiments of magnetization configurations that may be introduced into multilayered magnetic materials;

FIGS. 5A-5H are schematic illustrations of embodiments of MFM probe tip configurations;

FIGS. 14A-14D are scanning electron microscope (SEM) micrographs of embodiments of a conical MFM probe tip substrate during the first patterning operation that introduces a circular plateau having a diameter of about 0.6 μm into the MFM probe tip substrate;

FIGS. 15A-15E are SEM micrographs of an embodiment of a conical MFM probe tip substrate during the first patterning operation that introduces a circular plateau having a diameter of about 1 μm into the MFM probe tip substrate;

FIGS. 16A-16E are SEM micrographs of an embodiment of a conical MFM probe tip substrate during the first patterning operation that introduces a circular plateau having a diameter of about 2 μm into the MFM probe tip substrate;

FIGS. 17A-17E are SEM micrographs of an embodiment of a conical MFM probe tip substrate during the first patterning operation that introduces a circular plateau having a diameter of about 3 μm into the MFM probe tip substrate;

FIGS. 18A-18E are SEM micrographs of an embodiment of a pyramidal MFM probe tip substrate during the first patterning operation that introduces a triangular plateau having an edge length of about 1.5 μm into the MFM probe tip substrate;

DETAILED DESCRIPTION

Figure 1A:
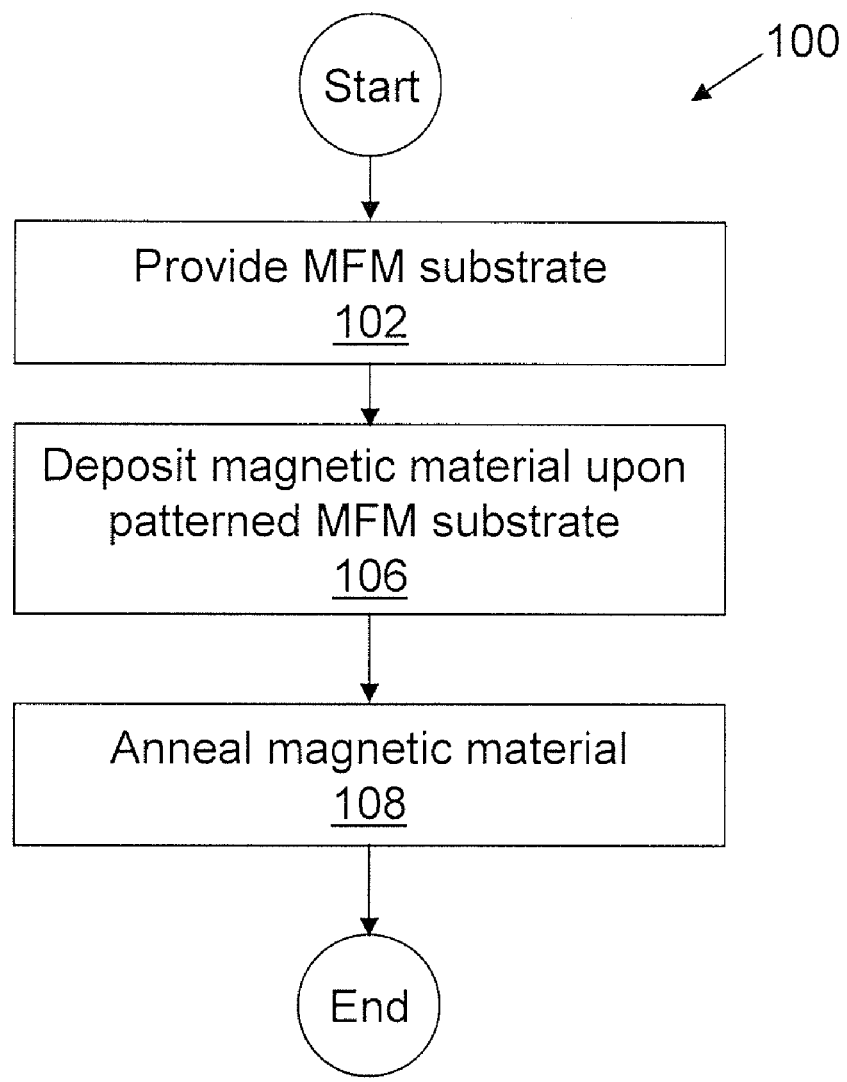
FIGS. 1A-1C are flow diagrams of embodiments of methods of fabricating a Magnetic Force Microscopy (MFM) probe tip.

Present spatial resolutions of MFM probes under ambient conditions, e.g., approximately 20 nm, do not represent a fundamental limit of resolution. Most MFM systems use the so called tapping mode to image a sample. In this mode, a probe oscillates in a vertical direction at a frequency near its mechanical resonance. The MFM signal is measured as the change of the mechanical resonance as a result of the magnetic interaction between the probe and a sample under study. Though a characteristic average separation between the tip of the probe and the sample can be defined (often referred to as the scan height), the spatial resolution may be limited by the effective dimensions of the magnetic tip itself.

Accordingly, one of the main challenges in improving MFM probe resolution is to reduce the effective physical dimensions of the magnetic probe and maintain the strength of the magnetic signal at an adequate level for detection. The presence of ultra-sharp probes alone is thus not enough to dramatically improve the special MFM resolution since even though the dimension of the MFM tip may be reduced by depositing a relatively thin magnetic layer, the signal level will not be sufficient in order to monitor the tip-sample magnetic interaction in ambient conditions. For optimal resolution, it is thus also important to have the magnetic material approximately confined to the apex of the MFM tip to a region below about 10 nm in diameter.

Embodiments of the present disclosure relate to novel MFM probe tips that provide enhanced spatial resolution and methods of manufacture. In one embodiment, magnetic thin films are effectively grown as multilayer structures on AFM probes. For example, two or more exchange decoupled magnetic layers may be deposited on a silicon-based AFM probe, separated by non-magnetic layers of selected thickness. In certain embodiments, the magnetic thin films may exhibit magnetic properties similar to the ones found in various types of magnetic media. In accordance with an embodiment, the magnetic probe and/or method of fabricating a magnetic probe can provide the following advantages: 1) MFM enhanced resolution under 10 nm in ambient conditions; 2) variable coercivity values; and 3) tunable sensitivity fields (in the cost of lateral resolution).

Further embodiments of the present disclosure relate to novel MFM probe tips formed by nanoscale patterning techniques. These techniques may be employed to fabricate probe tips that possess plateau features. These plateau features may serve as substrates for the deposition of magnetic films having properties similar to magnetic recording media. Machining techniques, such as Focused Ion Beam (FIB), may be further employed to reduce the size of the magnetic materials deposited upon the substrate. Beneficially, as the plateaus of the substrate are substantially flat and of known geometry, and the magnetic properties of magnetic films deposited on flat surfaces are similar to those deposited upon the plateau, the magnetization of the MFM probe tips may be determined to high accuracy. In this manner, fine control over the magnetic properties of MFM probe tips may be achieved, providing enhanced MFM resolution via deconvolution of the magnetostatic tip-sample interaction signal during a post-scanning analysis.

The configuration of the magnetic materials employed within the disclosed MFM probes may also be varied in order to further enhance the sensitivity of the MFM probe tips. In one embodiment, seed layers may be employed in conjunction with deposition of the magnetic layers of the probe tip. By placing a seed layer upon the plateau of the MFM substrate prior to deposition of the magnetic layer, the magnetization of the magnetic film may be aligned in a selected orientation. By selecting the orientation of the magnetization, the magnetic properties of the MFM probe tip may be better understood and contribute to enhancements in probe tip resolution. In further embodiments, layers of magnetic films may be employed, each having a selected magnetization, in order to provide fine control over the net magnetization of the MFM probe tip.

In other embodiments, the microstructure of the magnetic layers may be varied. For example, the magnetic layers may comprise continuous films (e.g., exhibit magnetically exchange coupled grains) as well as granular films (films that have both magnetic and non-magnetic regions and are considered to exhibit exchange decoupled grains). By adjusting the size of the non-magnetic regions, the spacing between magnetic grains may be varied, which enables adjustments of the magnetostatic and exchange interactions between the magnetic grains, and allows control over the coercivity values of the magnetic films. Furthermore, when MFM probe tips having granular magnetic films are patterned, they offer the potential of providing as little as a single magnetic grain spanning less than a few nanometers. In this manner, the size of the magnetic region of the MFM probe tip may be reduced in size, further providing a mechanism of control over the resolution of the probe tip.

In further embodiments, the manufacture of plateau-based probe tips may be refined through the use of a hard mask layer in the patterning process. The hard mask may be deposited as a layer upon the magnetic material and employed as a template for patterning the underlying magnetic material. The hard mask may be milled by FIB and subsequent patterning of the magnetic material may be performed by directional argon ion milling. Advantageously, in this manner, gallium ion implantation of the magnetic material, owing to the FIB milling, may be inhibited. These and other advantages of the novel MFM probe tips are described in detail below.

Figure 1B:
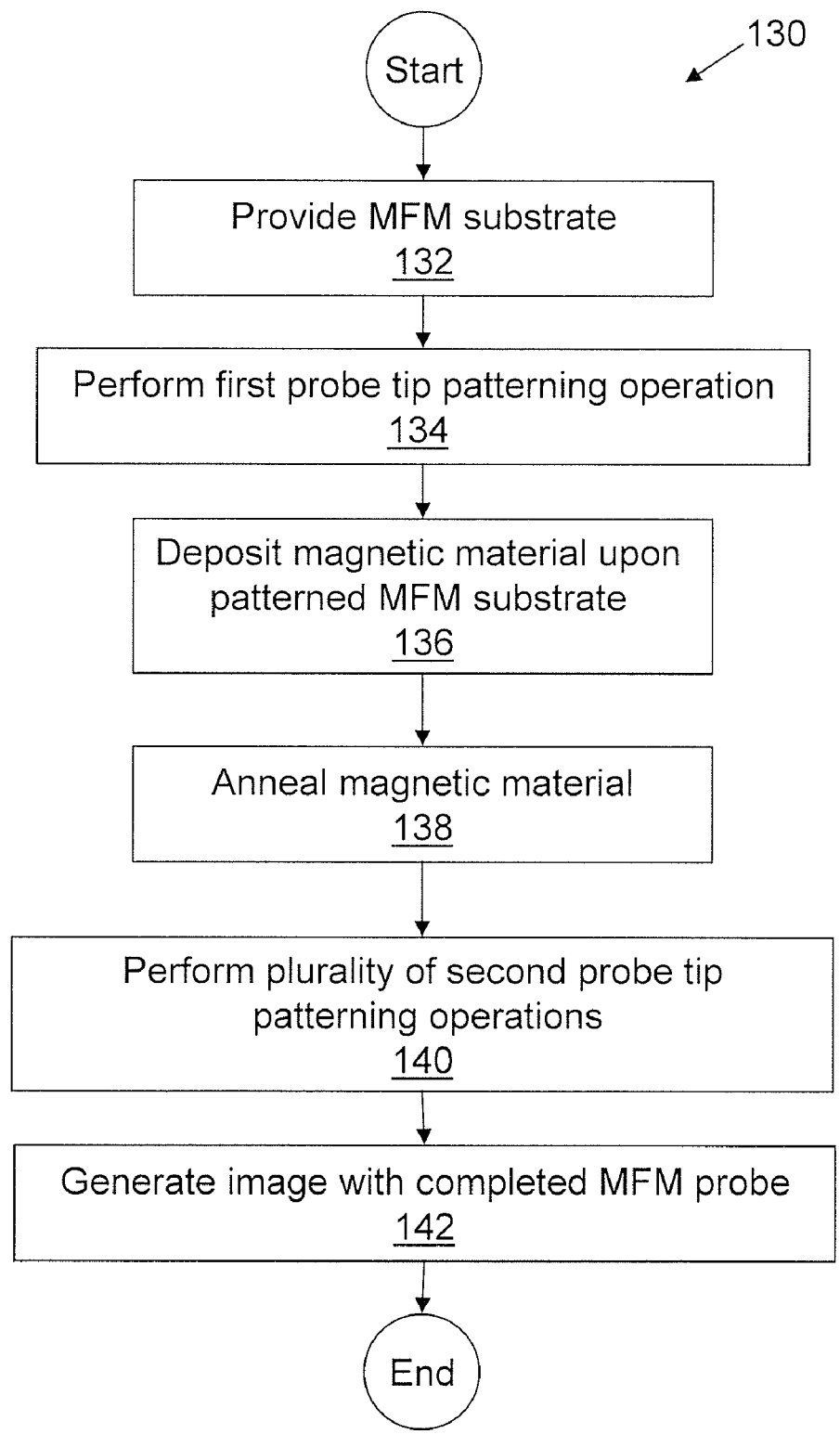
Figure 1C:
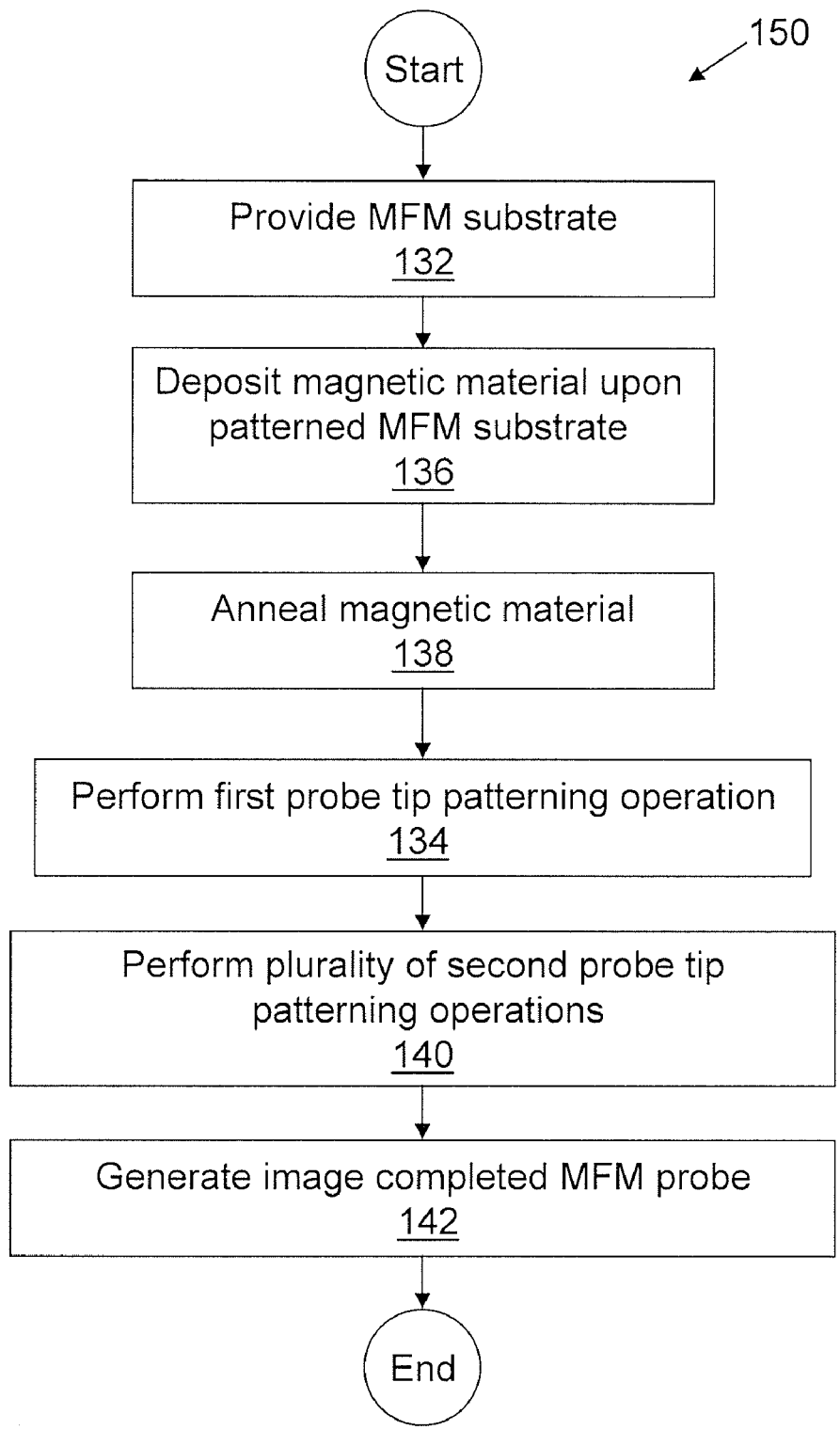

FIGS. 1A-1C present flow diagrams illustrating embodiments of methods 100, 130, and 150 for manufacturing MFM probes. The methods 100, 130, and 150 will be discussed with reference to FIGS. 2-7. It may be understood that the methods 100, 130, and 150 may be performed with greater or fewer operations than illustrated in FIGS. 1A-1C and the operations of methods 100, 130, and 150 may be performed in any order without limit.

The method 100 presents one embodiment of a process for the manufacture of an MFM probe. In certain embodiments, the method 100 may be employed to form a probe comprising a plurality of exchange decoupled magnetic layers that are each separated by a non-magnetic layer and deposited on an as-received AFM probe tip.

The method 100 begins in block 102 with provision of an MFM probe tip substrate. In certain embodiments, the MFM probe tip substrate may comprise a generally elongate material. Examples may include, but are not limited to, AFM probe tips, as known in the art. In additional embodiments, the MFM probe tip substrate may be provided as-mounted to a cantilever. In other embodiments, the MFM probe tip substrate may be provided by itself, without the cantilever. In certain embodiments, the MFM probe tip substrate may comprise silicon, silicon oxide, or silicon nitride.

Figure 2A:
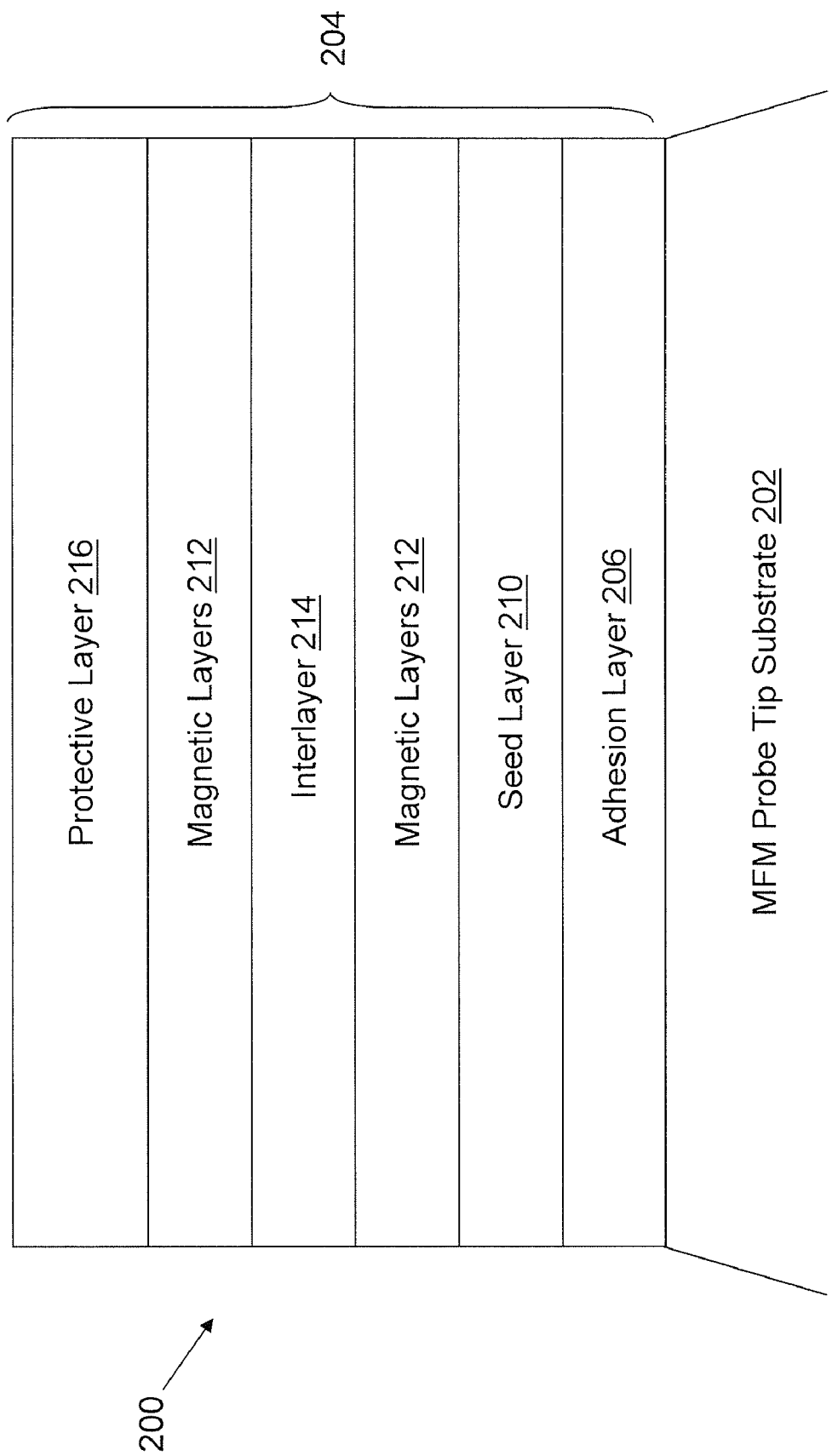
FIGS. 2A-2B are schematic illustrations of magnetic materials that may be deposited upon the MFM probe tip substrates.

In block 106 of the method 100, magnetic materials 204 may be deposited upon at least a portion of an MFM probe tip substrate 202, as illustrated in FIG. 2. The magnetic materials 204 may comprise one or more of an adhesion layer 206, a seed layer 210, a plurality of magnetic layers 212, an interlayer 214, and a protective layer 216. The adhesion layer 206 may be placed upon the MFM probe tip substrate 202, while the seed layer 210 may be positioned upon the adhesion layer 206 or the MFM probe tip substrate 202. The plurality of magnetic layers 212 may be positioned upon the seed layer 210. The interlayer 214 may be interposed between the magnetic layers 212, and the protective layer 216 may be positioned upon the upper most of the magnetic layers 212. The magnetic materials 204 may be deposited in place by one or more deposition techniques that may include, but are not limited to, Electron Beam Physical Vapor Deposition (EB-PVD), Chemical Vapor Deposition (CVD), Molecular Beam Epitaxy (MBE), E-beam and thermal evaporation, and sputtering.

In one embodiment, the adhesion layer 206 may be deposited upon the MFM probe tip substrate 202. The adhesion layer 206 may inhibit peeling of subsequently deposited layers from the underlying MFM probe tip substrate 202. The composition of the adhesion layer may include, but is not limited to, Titanium (Ti), Tantalum (Ta), Chromium (Cr), and Palladium (Pd). The thickness of the adhesion layer may vary between about 0.5 to 30 nm.

In one embodiment, the seed layer 210 may be deposited upon the adhesion layer 206. The composition of the deposited seed layer 210 may include, but is not limited to, Ruthenium (Ru), Chromium (Cr), Palladium (Pd), Platinum (Pt), Silver (Ag), and magnesium oxide (MgO). The thickness of the seed layer 210 may also be varied, as necessary. In further embodiments, the seed layer 210 may be deposited as a plurality of layers having different compositions and/or thicknesses. Embodiments of seed layers 210 are discussed in greater detail below.

Embodiments of the magnetic layers 212 may be deposited upon the seed layer 210. In certain embodiments, the composition of the deposited magnetic layers 212 may be configured so as to provide magnetic layers 212 that are magnetically continuous or exchanged coupled in the in-plane direction of the magnetic layer. Examples of compositions that provide substantially continuous magnetic layers 212 may include, but are not limited to, cobalt (Co), iron (Fe), and nickel (Ni). The thickness of the continuous magnetic layers 212 may also be varied. In further embodiments, the continuous magnetic layers 212 may be deposited as a plurality of layers having different composition and/or thickness ranging from 1 to 300 nm.

In alternative embodiments, compositions that provide substantially continuous (or highly exchange-coupled) magnetic layers 212 may comprise multilayer structures. Examples of multilayers structures may include, but are not limited to, cobalt/palladium (Co/Pd), cobalt/platinum, (Co/Pt), iron/platinum (Fe/Pt) and iron/palladium (Fe/Pd) multilayers. It may be understood that multilayered systems, such as Co/Pd, are a type of magnetic media that, even though composed of alternating layers (e.g., of Co and Pd), may be considered as a substantially uniform magnetic layer, since the layers within a stack of layers are magnetically exchange-coupled. Other embodiments can provide continuous magnetic layers 212 with $L1_0$ alloy compositions. Examples of $L1_0$ alloy compositions may include, but are not limited to, cobalt-palladium (CoPd), cobalt-platinum (CoPt), iron-platinum (FePt) and iron-palladium (FePd).

In other embodiments, the composition of the deposited magnetic layers 212 may be configured so as to provide magnetic layers 212 that are substantially granular. In certain embodiments, the composition of the magnetic layers 212 may be given according to the formula Alloy-X where the Alloy comprises of one of CoCr, and $L1_0$ FePt, FePd CoPd, CoPt, where Fe is iron, Pt is platinum, Pd is palladium, Co is cobalt, and Cr is chromium and X is an element that may include, but is not limited to, copper (Cu), silver (Ag), gold (Au), palladium (Pd), platinum (Pt), chromium (Cr), boron (B), carbon (C), boron (B), silicon oxide ($SiO_2$), and titanium oxide ($TiO_2$). In certain embodiments, the concentration of iron within the composition may range between about 30 to 70 at. %, based upon the total number of atoms of the composition. In other embodiments, the concentration of platinum within the composition may range between about 30 to 70 at. %, based upon the total number of atoms of the composition. In certain embodiments, the Fe concentration may be approximately 55 at. % and the Pt concentration may be approximately 45 at. %. In further embodiments, the concentration of element X within the composition may range between about 0 to 40 at. %, based upon the total number of atoms of the composition. Thickness may range from about 1 nm to 100 nm.

In an embodiment, the concentration of cobalt within an $L1_0$ composition may range between about 30 to 70 at. %, based upon the total number of atoms of the composition. In another embodiment, the concentration of iron within an $L1_0$ composition may range between about 30 to 70 at. %, based upon the total number of atoms of the composition. In further embodiments, the concentration of palladium within an $L1_0$ composition may range between about 30 to 70 at. %, based upon the total number of atoms of the composition. In other embodiments, the concentration of platinum within an $L1_0$ magnetic layer 124 may range between about 30 to 70 at. %, based upon the total number of atoms of the composition. Thickness may range from 1 nm to 100 nm.

In additional embodiments, compositions that provide substantially granular magnetic layers 212 may include, but are not limited to, cobalt-chromium based alloys (e.g., CoCrX), wherein X can be boron (B), Platinum (Pt), Titanium oxide ($TiO_2$), silicon oxide ($TiO_2$), oxygen ($O_2$), or no element. Thickness ranges from 1 nm to 100 nm.

An interlayer 214 may also be introduced between one or more of the magnetic layers 212. The interlayer 214 acts to inhibit exchange coupling interaction between the two magnetic layers 212. As a result, substantially only magnetostatic interactions between the magnetic layers 212 occur. The crystallographical orientation, composition, and thickness of the interlayer 214 may be selected, as necessary. In further embodiments, the thickness of the interlayer 214 may range from about 1 to 20 nm. The composition of the interlayer 214 may be selected from materials including, but not limited to, MgO, Ag, CrRu, Ru, Ti, Ta, Pd, and Pt.

In other embodiments, the protective layer 216 may be deposited upon the magnetic layers 212. The composition and thickness of the protective layer 216 may also be varied. The composition of the protective layer 216 may be selected from materials including, but not limited to, C, Pd, Pt, Ti, Ta, Pd, Au, Ag, and Cr. In further embodiments, the thickness of the protective layer 216 may range from about 1 to 20 nm.

The deposition operations of block 106 may also be configured such that the magnetic layers 212, either granular or continuous, adopt a selected magnetization orientation. In one embodiment, the seed layer 210 may be configured such that the grains of the magnetic layers 212 deposited upon the seed layer 210 adopt a selected orientation. This in turn imparts a selected magnetization vector to the magnetic layers 212. For example, in certain embodiments, as illustrated in FIGS. 3A-3B, the seed layer 210 may be selected such that the magnetization of the magnetic layers 212 is oriented in directions 300A, 300B that are substantially normal to the plane of the seed layer 210, also referred to as out-of-plane magnetization. In other embodiments, as illustrated in FIG. 3C-3D, the seed layer 210 may be selected such that the magnetization of the magnetic layers is oriented in directions 300C, 300D that are substantially parallel to the plane of the seed layer 210, also referred to as in-plane magnetization.

The material composition and crystal structure of the seed layer 210 may be selected in order to provide the magnetic layers 212 with a selected magnetization orientation. In one embodiment, out-of-plane magnetizations may be achieved by deposition of a CoCrPt magnetic layer 404 upon a Cr seed layer 210. In alternative embodiments, magnetic layers 212 having out-of-plane magnetizations may be achieved by deposition of a $L1_0$ FePt magnetic layer 212 upon an MgO seed layer 210.

In the deposition operation 106, the magnetic material 200 may be further configured to adjust the magnetization of the MFM probe tip. For example, as discussed below, the magnetic materials 200 may comprise a plurality of pairs of seed layers 210 and magnetic layers 212 having selected magnetizations, where the seed layer-magnetic layer pairs are separated from one another by interlayers 214. In this fashion, the magnetic layers 212 may be magnetically decoupled from one another and each may exhibit a different coercivity value, enabling switching of magnetization in individual layers. In this manner, it may be possible to control the magnetic field just above the surface of the magnetic material 200 by switching the magnetization of the decoupled magnetic layers 212.

FIGS. 4A-4D and 4E-4H illustrate examples of configurations of embodiments of the seed layers 210 and magnetic layers 212 in out-of-plane and in-plane configurations, respectively. It may be understood that these examples are provided for illustrative purposes and should not be construed to limit the disclosed embodiments.

In one embodiment, as shown in FIGS. 4A-4B and 4E-4F, out of plane magnetic layers 212A, 212A' and 212B, 212B' or in-plane magnetic layers 212C, 212C' and 212D, 212D' may be aligned parallel with one another, increasing the strength of the magnetic field emanating from the magnetic material 200. In another embodiment, illustrated in FIGS. 4C-4D and 4G-4H out of plane magnetic layers 212A, 212B' and 212B, 212A' or in-plane magnetic layers 212C, 212D', 212D, 212C' may be aligned anti-parallel with one another, decreasing the strength of the magnetic field emanating from the magnetic material 200. It may be understood the magnetic material 200 may comprise any number of seed layers 210 and magnetic layers 212 in order to adjust the strength of the magnetic field that emanates from the magnetic material 200.

Optionally, after deposition of the magnetic layers 212, an annealing operation may be performed in block 108. The temperature of the annealing operation may be varied between about 200 to 700° C. and the time may be varied between about 1 to 120 minutes. In general, as the annealing temperature is increased, the coercivity of the magnetic layers 212 increases. At higher temperature the $L1_0$ crystalline transformation, from Face-Centered-Cubic (FCC) to Face-Centered-Tetragonal (FCT), takes place and as a result, the magnetic properties of the magnetic layers 212 alter from magnetically soft to magnetically hard (up to about 100 k Oe).

In certain embodiments, through method 100, an anti-ferromagnetic state for the magnetic layers 212 (e.g., a first and a second magnetic layers) may be achieved. The flux in each of the first and second magnetic layers may approximately be balanced (e.g., cancel) by the oppositely directed flux in the other layer, except for a relatively small region on the tip of the probe. This region may be of selected size, for example, ranging between about 1 to 20 nm. In further embodiments, this region may be less than about 10 nm. In certain embodiments, these regions may be approximately circular, centered about at the tip of the probe. The strength of the flux and/or magnetic field emanating from the tip of the probe may also be controlled by the configuration of the magnetic layers, as discussed above (e.g., number of layers, magnetization orientation, thickness, composition, and the like). Examples of the resolution achievable employing embodiments of such a probe are discussed below in conjunction with Example 1.

Another embodiment of a method for the manufacture of an MFM probe is illustrated in FIG. 1B. The method of FIG. 1B represents an extension of the method 100 described above with respect to FIG. 1A by deposition of magnetic materials 200 on MFM probe tip substrates 202 having plateaus. Owing to the substantially flat, known geometry of the plateau structure, the magnetization of the MFM probe tip may be determined with high accuracy, providing fine control over the magnetic properties of the MFM probe tips and enhanced MFM resolution.

The method 130 begins in block 132 with provision of an MFM probe tip substrate 202. In one embodiment, the MFM probe tip substrate 202 may be provided as-mounted to a cantilever 504, as illustrated in FIGS. 5A, 5C, 5E, and 5G.

In other embodiments, the MFM probe tip substrate 202 may be provided by itself, without the cantilever 504.

The composition of the MFM probe tip substrate 202 may be selected based upon the intended application. In certain embodiments, the MFM probe tip substrate 202 may comprise silicon, silicon oxide, or silicon-nitride. In further alternative embodiments, the MFM probe tip substrate may comprise AFM probe tips, as known in the art.

Figure 5C:
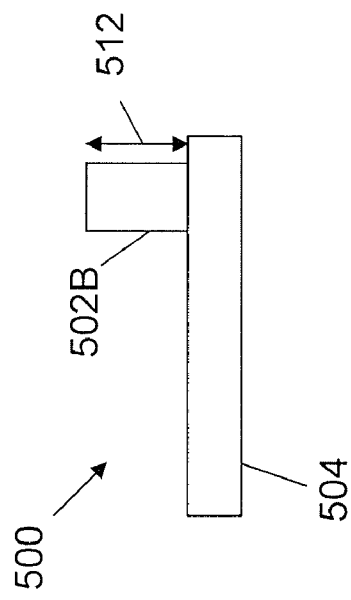
Figure 5D:
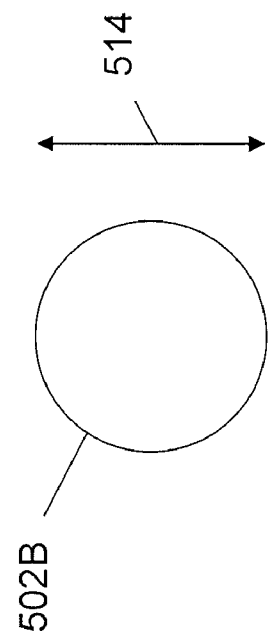
Figure 5A:
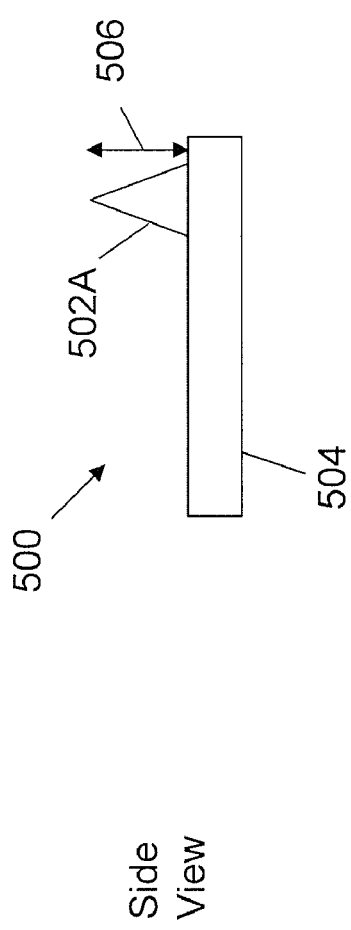
Figure 5B:
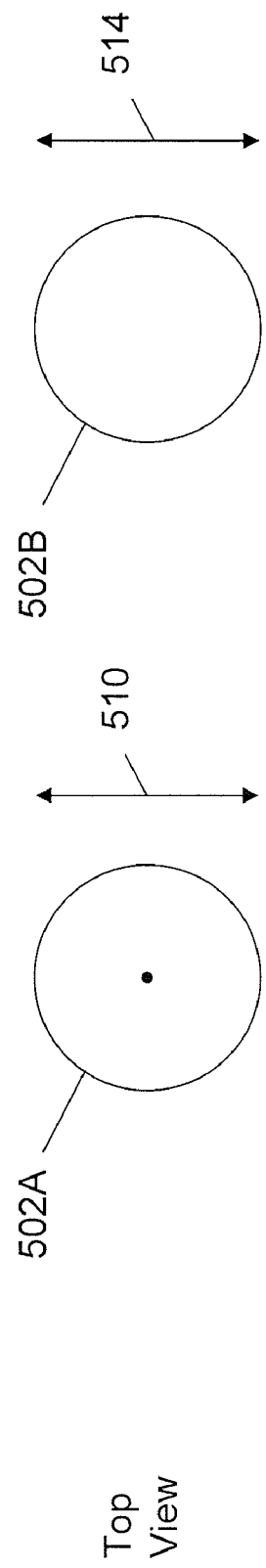

In one embodiment, the MFM probe tip substrate 202 may possess a conical geometry 502A, as illustrated in FIGS. 5A, 5B, with a cone height 506 and cone base diameter 510. In certain embodiments, conical MFM probe tip substrates 502A may comprise right circular cones.

In another embodiment, the MFM probe tip substrate 202 may possess a cylindrical geometry 502B, as illustrated in FIGS. 5C, 5D, with a cylinder height 512 and a cylinder base diameter 514. In certain embodiments, cylinder MFM probe tip substrates 502B may comprise right circular cylinders.

In a further embodiment, the MFM probe tip substrate 202 may possess a pyramidal geometry 502C, with a base that is, for example trilateral, as illustrated in FIGS. 5E, 5F, or quadrilateral 502D, as illustrated in FIGS. 5G, 5H, with a pyramidal height 516 and base edge lengths 520. In certain embodiments, pyramidal MFM probe tip substrates 502C, 502D may comprise right circular cylinders.

Figure 6A:
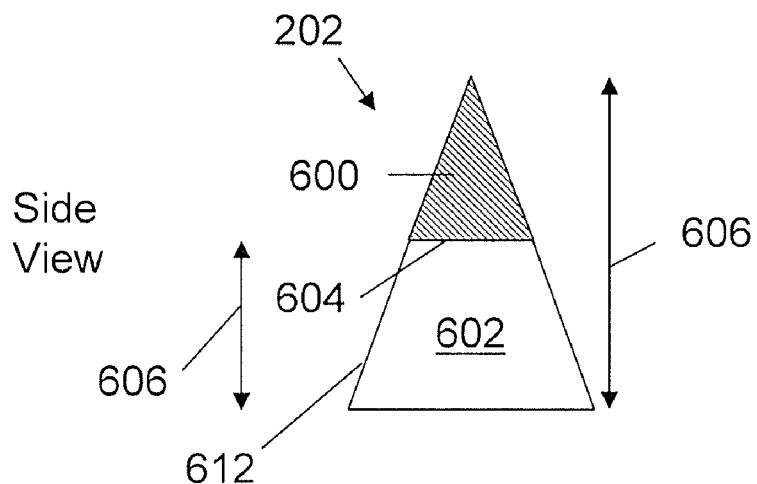
FIGS. 6A-6C are schematic illustrations of embodiments of an MFM probe tip substrates patterned in a first patterning operation that introduces a plateau region in the MFM probe tip substrate.
Figure 6B:
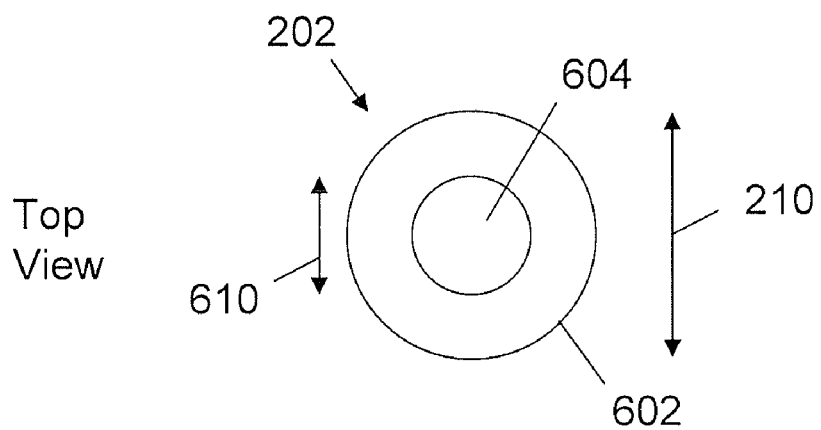

In block 134 of the method 130, a first patterning operation may be performed upon the MFM probe tip substrate 202, as illustrated in FIGS. 6A-6B. For clarity, operations of the method are discussed below with respect to a MFM probe tip substrate 202 possessing a conical geometry. It may be understood, however, that this geometry is illustrated for example purposes only and that the operations of the methods 130 may be performed using MFM probe tip substrates 202 having any configuration without departing from the scope of the disclosed embodiments.

Figure 6C:
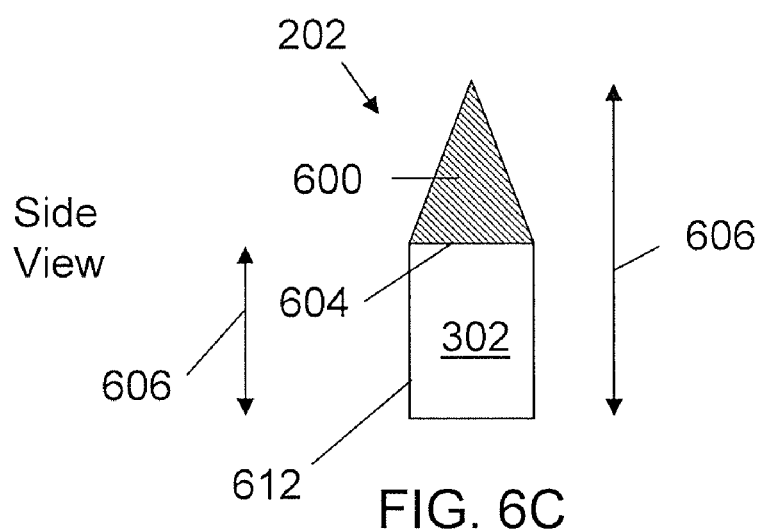

In one embodiment, a first portion 600 of the MFM probe tip substrate 202 may be removed, leaving a second portion 602 of the MFM probe tip substrate 202 remaining which possesses a plateau 604 and a height 606. The plateau 604 may further possess a diameter 610 (or alternatively, edge length, hypotenuse, or other identifiable length scale, if polygonal, rather than a circular) after the first patterning operation. In other embodiments, portions of the lateral edges 612 of the MFM probe substrate 602 may be removed prior to, or after, formation of the plateau 604. For example, as illustrated in FIG. 6C, a portion of the lateral edges 612 may be removed to provide the second portion 602 of the AFM probe tip substrate 202 with a substantially cylindrical geometry.

The patterning process may be performed using a variety of techniques. In one embodiment, the MFM probe tip substrate 202 may be patterned by wet chemical etching. In other embodiments, the MFM probe tip substrate 202 may be patterned by FIB milling.

In block 136 of the method 100, magnetic materials 200 may be deposited upon at least a portion of the surface of the plateau 604 of the MFM probe tip substrate 202. The deposition, and optionally annealing, of magnetic materials may be conducted as discussed above with respect to FIG. 2 and blocks 106 and 108 of method 100.

Figure 7:
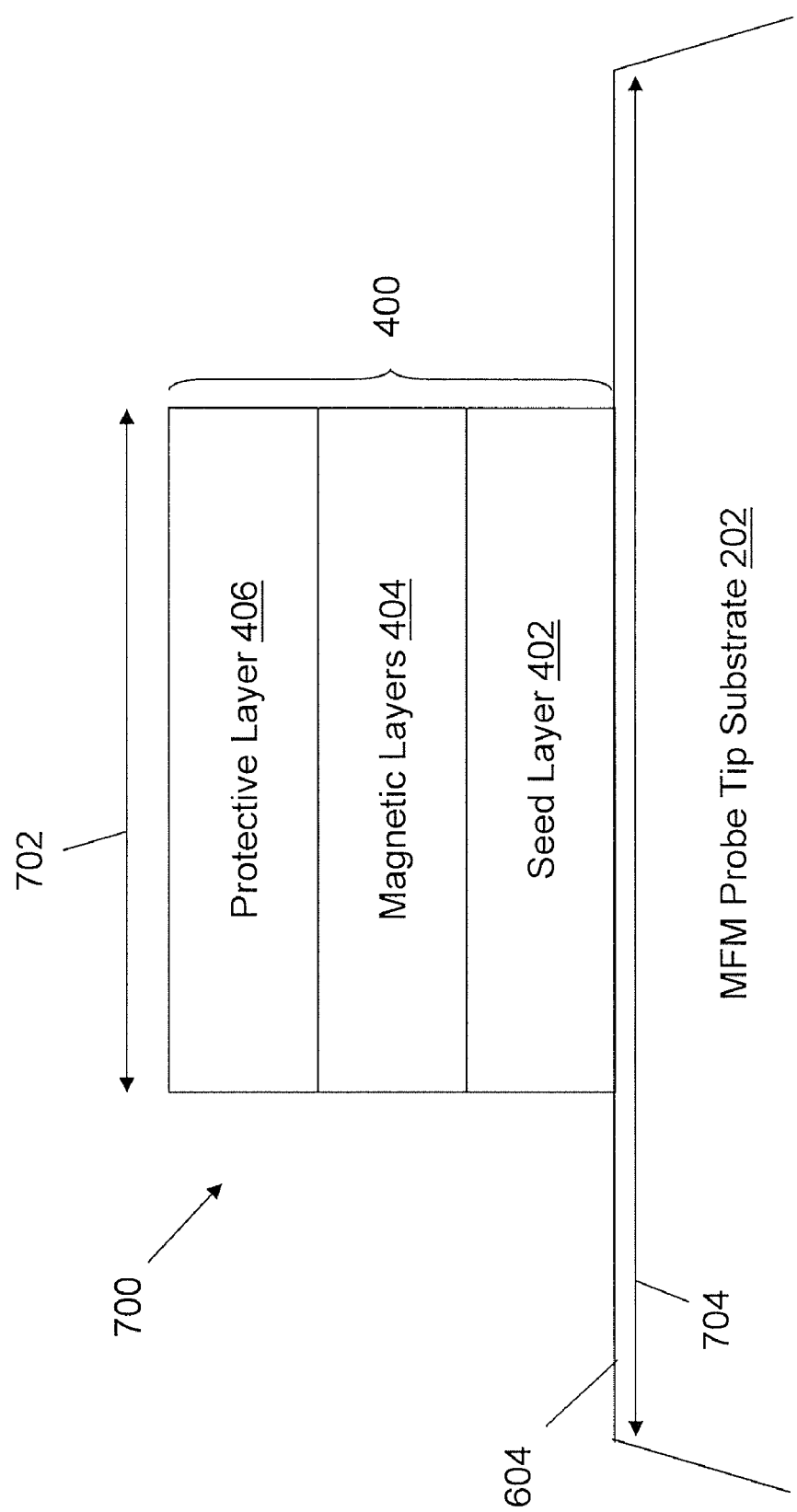
FIG. 7 is a schematic illustration of an embodiment of an MFM probe tip after a second patterning operation has been performed to pattern the magnetic material deposited upon the MFM probe tip substrate.

In block 140, a plurality of second probe tip patterning operations may be performed to adjust the geometry of the magnetic material 200 deposited upon the surface of the plateau 604. As illustrated in FIG. 7, one or more second patterning operations may remove a portion of the magnetic material 200, yielding patterned magnetic material 700 having a spatial extent 702 (e.g., width, diameter, and the like) that is smaller than the spatial extent 704 of the plateau 604.

In certain embodiments, FIB may be employed to pattern the magnetic material 200 in the second probe tip patterning operations. For example, an SEM-FIB may be used to target a selected location on the magnetic material 200 within the plateau 604 via SEM imaging and to further remove the magnetic material 200 material around the targeted area with FIB milling. In a first operation, at least a portion of the surface around the selected location may be removed using a high beam current of about (e.g., about 50-100 pA). In a second operation, the final dimension of the patterned magnetic material 700 may be achieved by use of a low beam current (e.g., about 1-10 pA).

After fabricating the MFM probe tip from magnetic material 200, an MFM image may optionally be acquired with the newly fabricated MFM probe tip. Depending upon the type of tip that is fabricated, the spatial resolution of the acquired MFM image may be analyzed to determine whether the image is of acceptable quality or if further signal processing of the MFM image is necessary. Should further signal processing be necessary, post-imaging signal processing, such as deconvolution, can be applied to further enhance the resolution of the MFM image.

In alternative embodiments, the deposition and patterning operations of method 130 may be reordered. For example, in embodiments of a method 150, illustrated in FIG. 1C, the first patterning operation of block 134 may be performed after the deposition of magnetic material in block 136 and, optionally, annealing in block 138.

In certain embodiments, MFM probe tip substrates fabricated according to embodiments of the methods 130, 150 may possess at least one of coercivity values ranging between about 0.05-5 T and control of tip magnetic moment within a selected range.

Figure 2B:
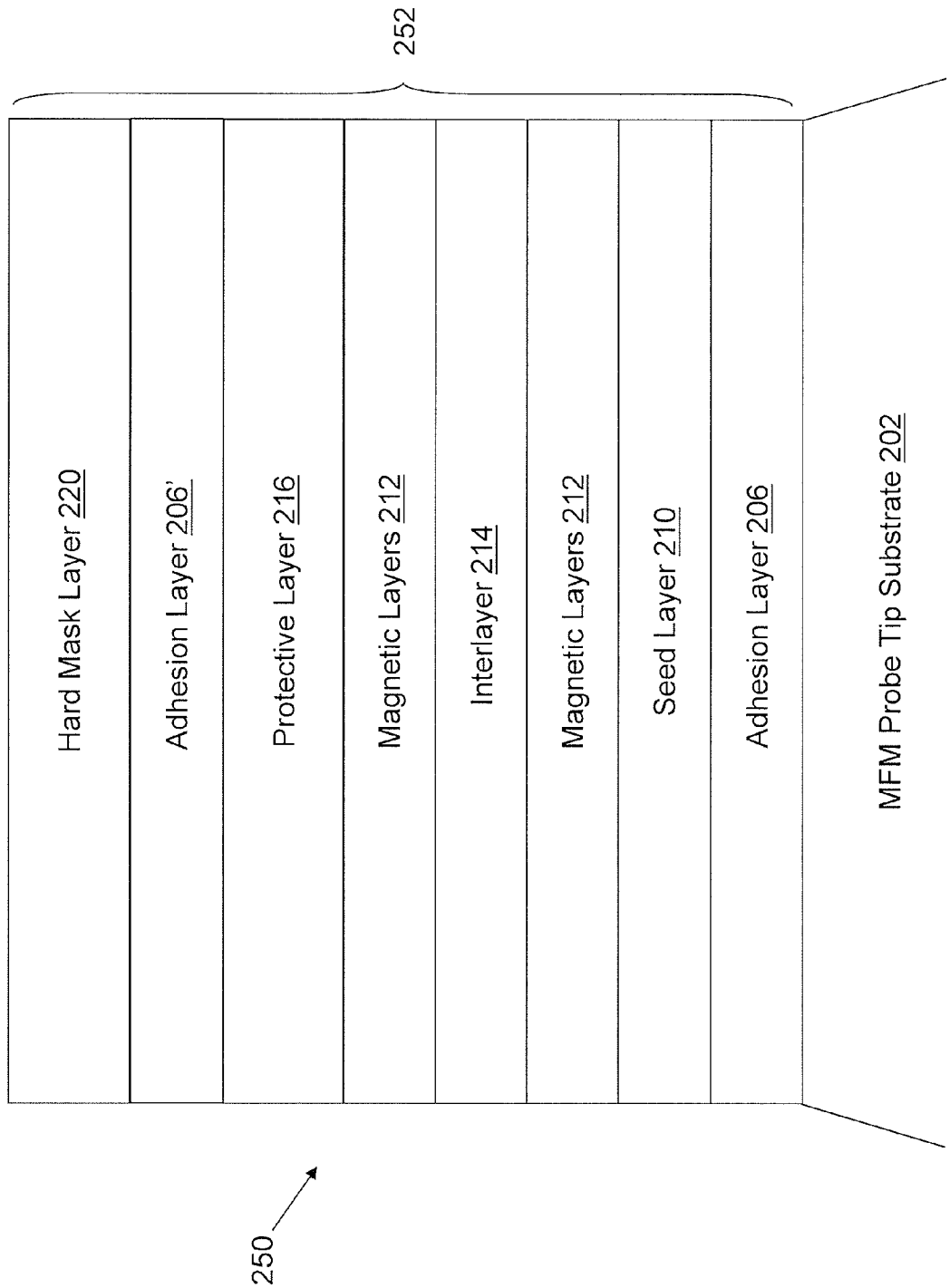
Figures 4A, 4B:
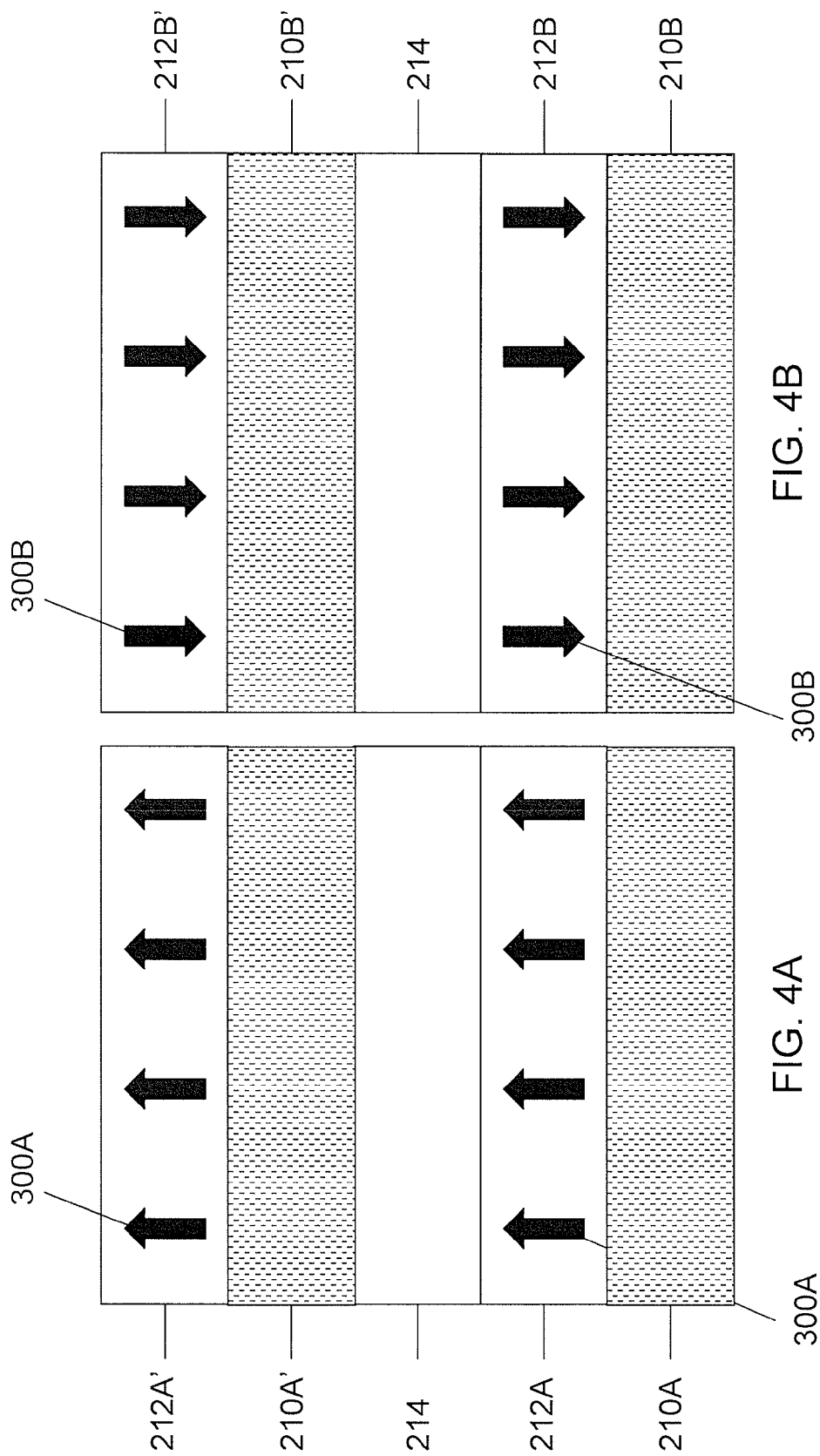

As discussed above, the physical dimensions of the MFM probe tips may be controlled via FIB milling. While for about 50 nm tip diameter, FIB is sufficient for machining operations, improved results may be achieved by further incorporating a hard mask layer (also referred to as a mask layer) to the patterning process, as illustrated in FIG. 2B.

The mask layer 220 may be deposited upon the protective layer 216 or on the upper most magnetic layer 212. An adhesion layer 206' may be deposited upon the protective layer 216 in order to promote adherence of the mask layer 220 to the other layers of the stack. The mask layer 220 may further include a seed layer, interposed between itself and the adhesion layer. A protective layer may also be deposited upon the mask layer 220. Embodiments of the mask layer may comprise, but are not limited to MgO, $Al_2O_3$, $Si_3N_4$, ITO, C, and combinations thereof Embodiments of the mask seed layer may include, but are not limited to Ti, Cr, and Ta. The thickness of the mask layer and the mask seed layer may range between about 1 to 10 nm and 1 to 5 nm, respectively.

The dimensions of the MFM probe tip may be defined by FIB milling in a manner similar to that described before, with the exception that instead of milling the entire stack of layers comprising the magnetic materials 200, only the mask layer may be milled with FIB. Subsequently, the stack of layers may be milled via directional argon ion milling.

In the case of an MgO mask layer, the relative milling rates can be tuned to selectively mill the composition of a magnetic tip with a ratio below about 1:100 nanometers. Hence, an MgO layer thickness of about 2 nm can withstand a stack milling about 200 nm thick. Among the advantages of a relatively thin and hard mask layer are sub-10 nm tip diameter, inhibition of gallium ion implantation in the magnetic layers 212, and heating/melting of the tip composition due to the ion milling.

Example fabrication parameters for an MgO hard mask layer may include, but are not limited to the following. Deposition of a seed layer of about 2 nm of titanium (2) sputter-deposition at a rate of about 0.13 Angstroms per second with a base pressure of $\sim 1 \times 10^{-8}$ Torr and a Radio-Frequency (RF) power of 270 watts (3) Room temperature deposition. Argon milling may be performed via inductive coupled plasma under about 200 watts forward power and about 40 watts substrate bias under about 10 mTorr pressure. AFM examinations have indicated that for these power and pressure settings used in the argon milling, the MgO layer was substantially unaffected for more than about 100 nm milling of a single crystal silicon substrate.

EXAMPLES

In the following examples, embodiments of the MFM probe manufacturing processes disclosed herein, and the performance of probe tips formed therefrom, are discussed in greater detail. The examples highlight the adaptability of the manufacturing processes and the enhanced performance offered by the MFM probe tips. It may be understood, however, that these examples are discussed for illustrative purposes and should not be construed to limit the embodiments of the invention.

Example 1

MFM Probes Formed On As-Received AFM Tips

In accordance with an illustrative embodiment, two magnetically exchange decoupled magnetic layers were sputter deposited on a silicon AFM probe. Two, approximately 10-nm thick layers of an approximately FePt (45/55) alloy were employed as the magnetic layers. To break the short-range quantum-mechanical exchange coupling while maintaining an antiferromagnetic magnetostatic coupling and to induce out-of-plane magnetic orientation of the topmost magnetic layer, the two magnetic layers were separated by an approximately 8-nm thick MgO interlayer. In certain embodiments, the $L1_0$ phase of FePt (approximately 45/55) may provide anisotropy greater than about 1 T.

To create an ultra-high-anisotropy $L1_0$ phase, the magnetic mixture was annealed at temperature of about 650° C. for approximately 15-25 minutes. Heating provided at least two benefits, creation of an ultra-high anisotropy magnetic phase in the magnetic materials and relaxation of the magnetization into a global equilibrium anti-ferromagnetic state, i.e. with the magnetization being oppositely directed in the two layers, approximately minimizing the magnetostatic energy.

Figure 8:
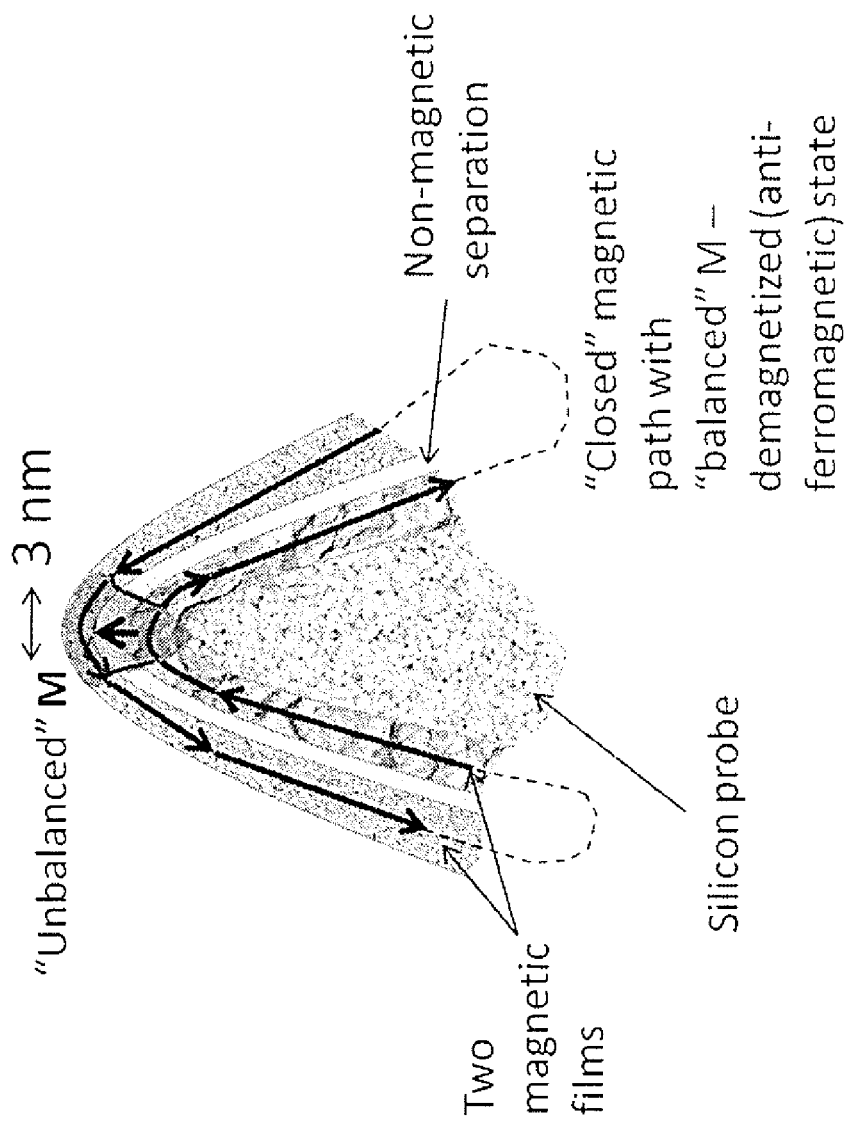
FIG. 8 is a schematic illustration of the a magnetization configuration in an anti-ferromagnetic MFM probe, where the tip region includes a magnetization region in which the two magnetic layers do not cancel out, and the unbalanced region substantially defines the resolution of the probe.

FIG. 8 shows a schematic presentation of the magnetization configuration in the sharp tip of a silicon etched probe. In the anti-ferromagnetic state, the flux in each layer is substantially balanced off by the oppositely directed flux in the other layer approximately everywhere in the probe, with the exception of a relatively small region on the tip of the probe. The small, magnetically unbalanced region in the tip region could be also triggered via FIB-deposition (focused ion beam-deposition) of a small island (or portion) on the tip of the probe before deposition of the magnetic material (i.e., a first and a second layer of magnetic material). In this unbalanced region, the amount of the material with one direction of the magnetization exceeds the amount of the material with the opposite direction of the magnetization. Therefore, this unbalanced region establishes the effective region of the magnetic probe. It can be appreciated that depending on the curvature of the original silicon probe and the thickness of the magnetic material, the effective magnetic region can be varied within a relatively wide range. In accordance with one embodiment, the effective diameter of the unbalanced region, due to a demagnetized multi-domain state, was estimated via micromagnetic simulations to be of the order of 3 nm.

Figure 9:
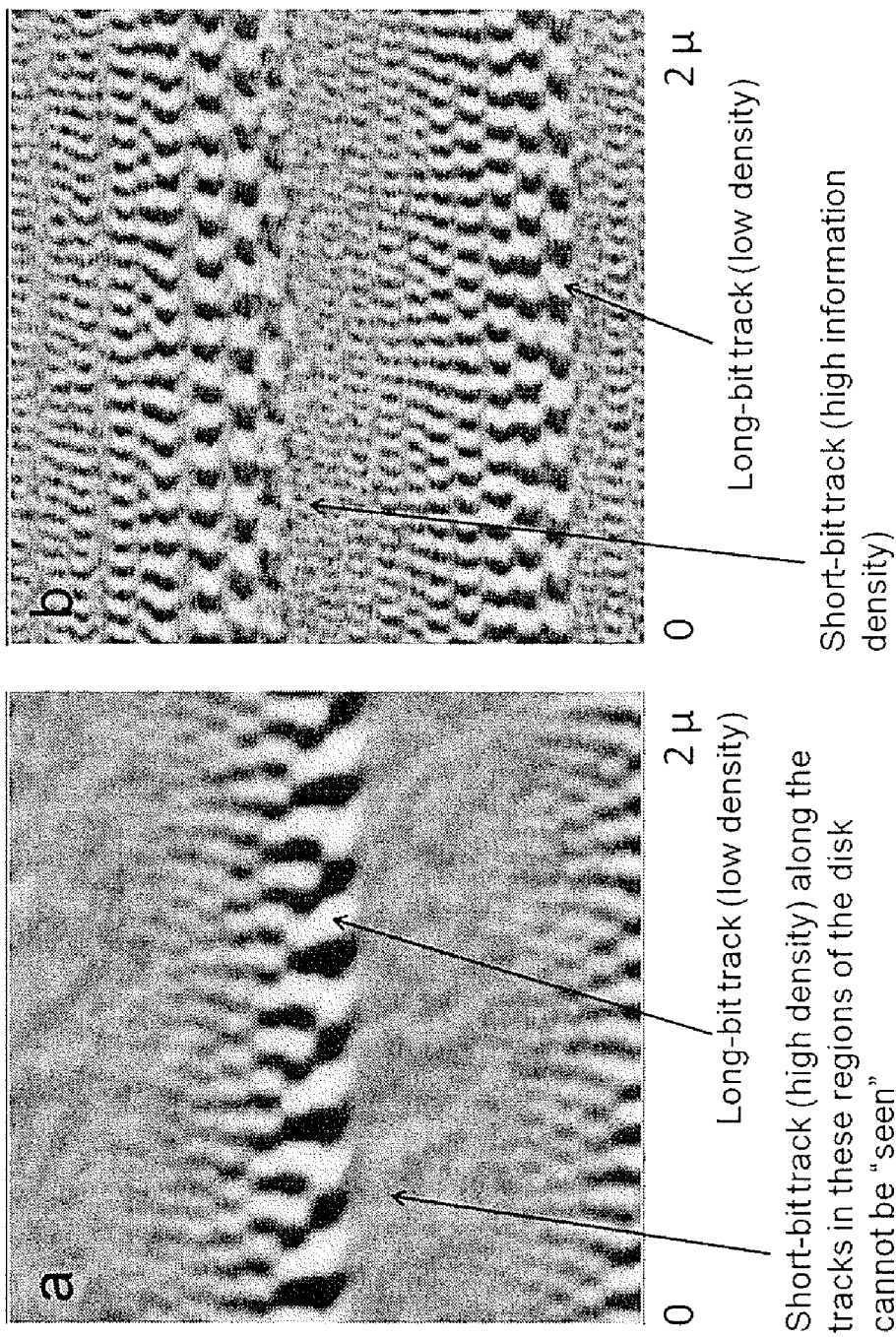
FIGS. 9A-9B are MFM images of approximately 2-micron square regions in reference magnetic disks with continuously recorded sub-100-nm wide tracks of varying linear densities read back by a commercial MFM probe (left image) and an MFM probe of an embodiment of the present disclosure.

FIG. 9 shows two MFM images of approximately $2 \times 2$ $\mu m^2$ regions taken from a specially recorded reference magnetic disk by a commercial MFM probe, MFMR (NanoWorld, left image) and the above described MFM probe (right image), respectively. A set of tracks with varying linear densities were continuously recorded into the reference ultra-high-density perpendicular magnetic disk with a Guzik spinstand. In other words, an entire section of the disk was covered with sub-100-nm tracks of bits with the length in each track gradually changing from one track to the next. If MFM imaging shows blank regions on the disk, this is because the resolution of the probe is not adequate to detect the ultra-high density information recorded in these regions.

Figure 10:
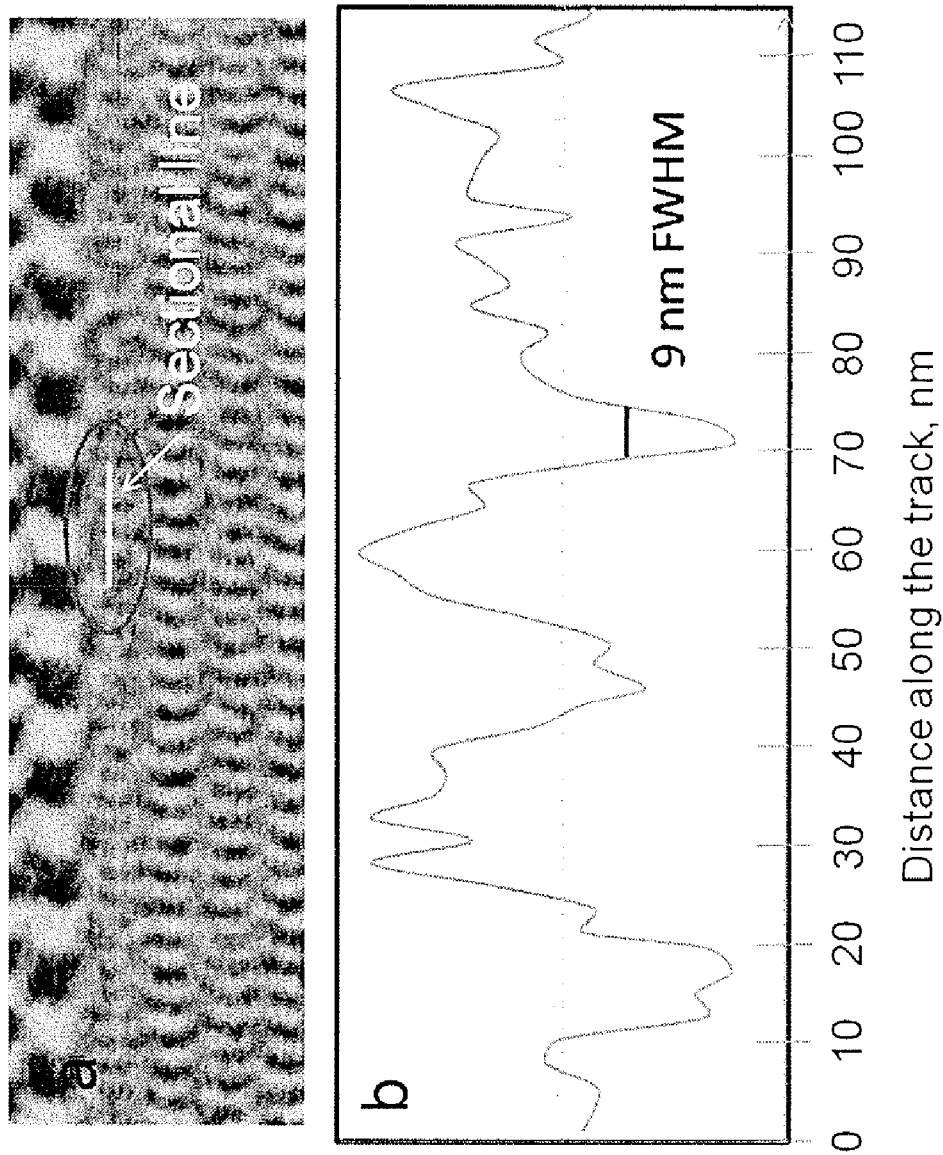
FIGS. 10A and 10B are quantitative section line measurement of an MFM signal measured along a high-density track.

It can be seen that the commercial probe is not capable of reading all the tracks with relatively high linear densities, i.e. with bit features of smaller than approximately 20 nm. This explains the presence of relatively large monochromatic, e.g., blank, regions, with no distinguishable features, where otherwise ultra-high density information could have been seen. On the contrary, the above described anti-ferromagnetic multi-domain probe can distinguish all the tracks recorded into the disk. That is why in the latter case, substantially the entire $2 \times 2$ $\mu m^2$ region can be seen to be covered by tracks. In fact, in accordance with an exemplary embodiment, a magnetic probe as described herein can be used to detect information with areal densities much greater than 1 terabit/in$^2$. A more quantitative sectional line graph measured along the high-density track is shown in FIG. 10A-B showing a full-width-half-maximum (FWHM) less than 10 nm.

In accordance with an embodiment of the probe, to confirm that such high resolution is indeed inherent to the anti-ferromagnetic configuration of the probe, the following experiment was conducted. The same magnetic probe was exposed to a magnetic field of over 2 Tesla along the probe axis.

Figure 11:
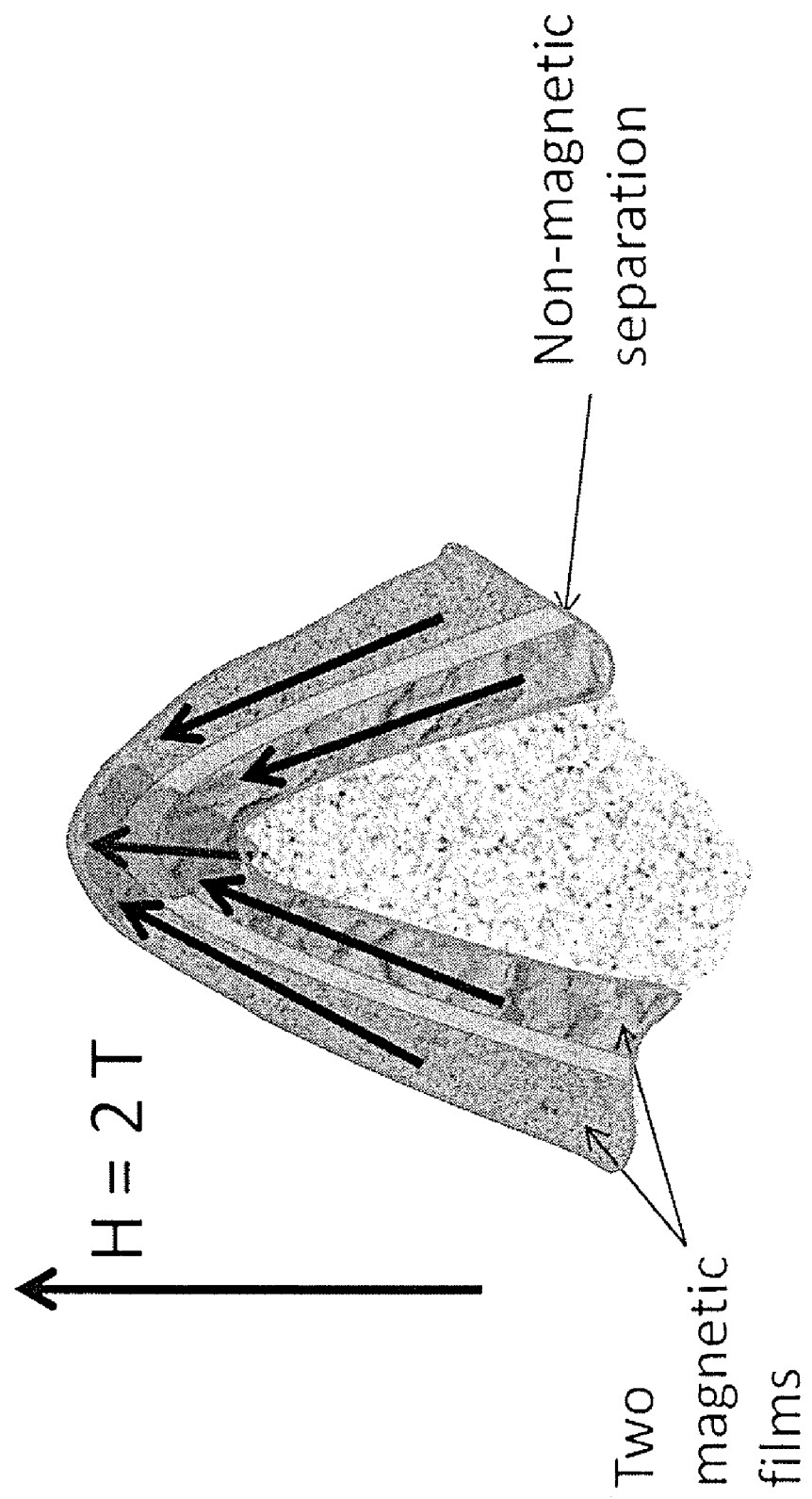
FIG. 11 is a schematic illustration of a saturated (ferromagnetic) state of an embodiment of a bi-layer MFM probe.

Because the coercivity of each layer in the above described probe is of the order of 1 Tesla, as previously measured via a specially designed MFM experiment, it can be appreciated that the field of 2 Tesla is sufficient to drive the probe in a saturated (ferromagnetic) state, i.e. with the magnetization in both layers in the same direction, as shown in FIG. 11. In this regard, it was shown that the ferromagnetic probe is equivalent to a conventional MFM probe with one magnetic layer.

Figures 12A, 12B:
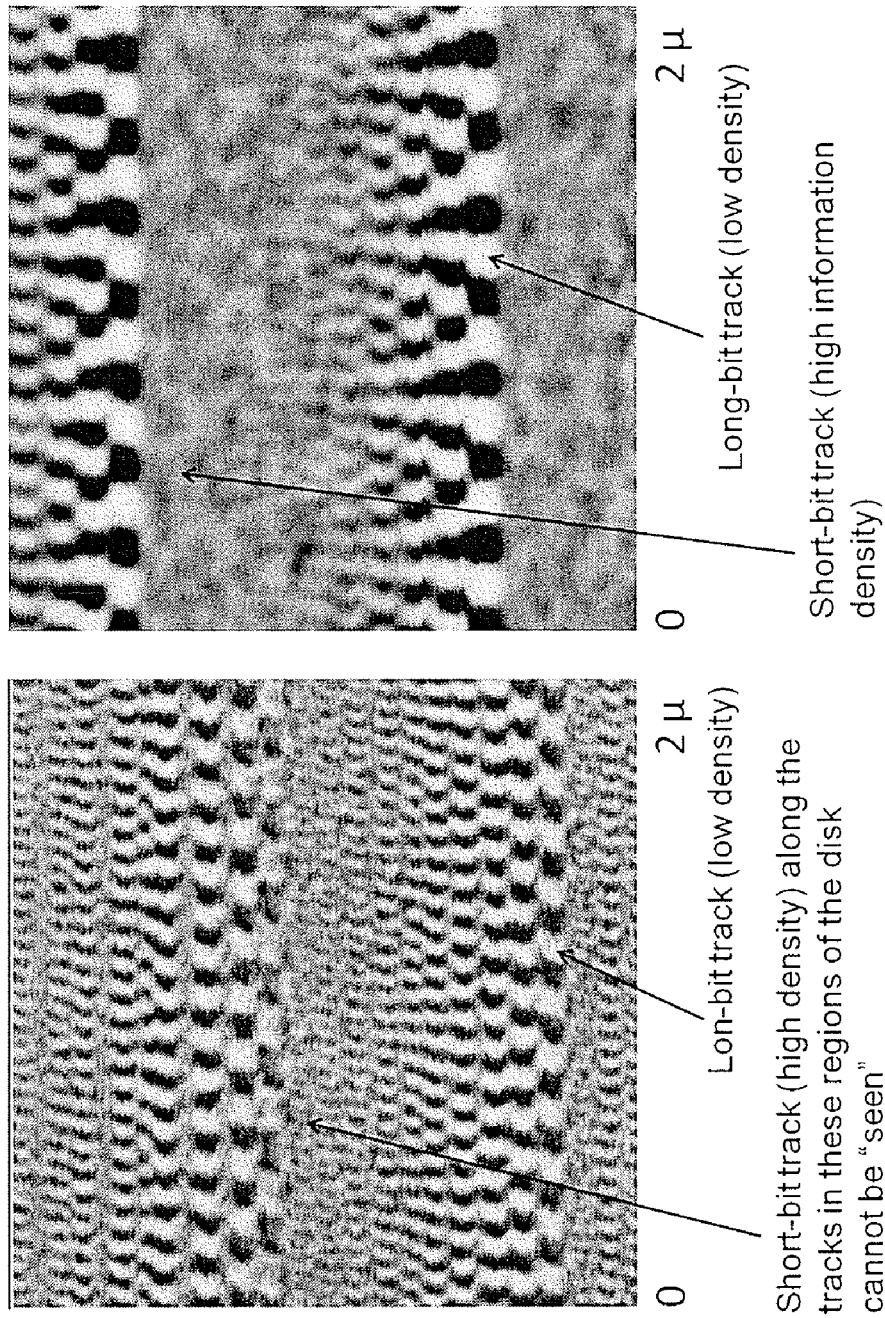
FIGS. 12A-12B are MFM images of approximately 2-micron square regions in reference magnetic disks with continuously recorded sub-100-nm wide tracks of varying linear densities read back by a sub-10-nm-resolution multi-domain (anti-ferromagnetic) MFM probe after annealing (left image), and after magnetizing at a field greater than about 2 Tesla (right image)

The ferromagnetic probe was also used to scan the same reference disk. For comparison, MFM images taken by the anti-ferromagnetic and ferromagnetic probes are shown in FIG. 12, left and right, respectively. As expected, the resolution of the ferromagnetic probe is not as good, though the strength of the signal is greater, compared to the same properties for the anti-ferromagnetic probe. In the case of the ferromagnetic probe, the entire probe participates in MFM imaging. It can be appreciated that the larger amount of the working magnetic material contributes to the increase of the signal while the larger size of the effective probe tip results in the lower resolution compared to the anti-ferromagnetic probe.

Figures 13A, 13B:
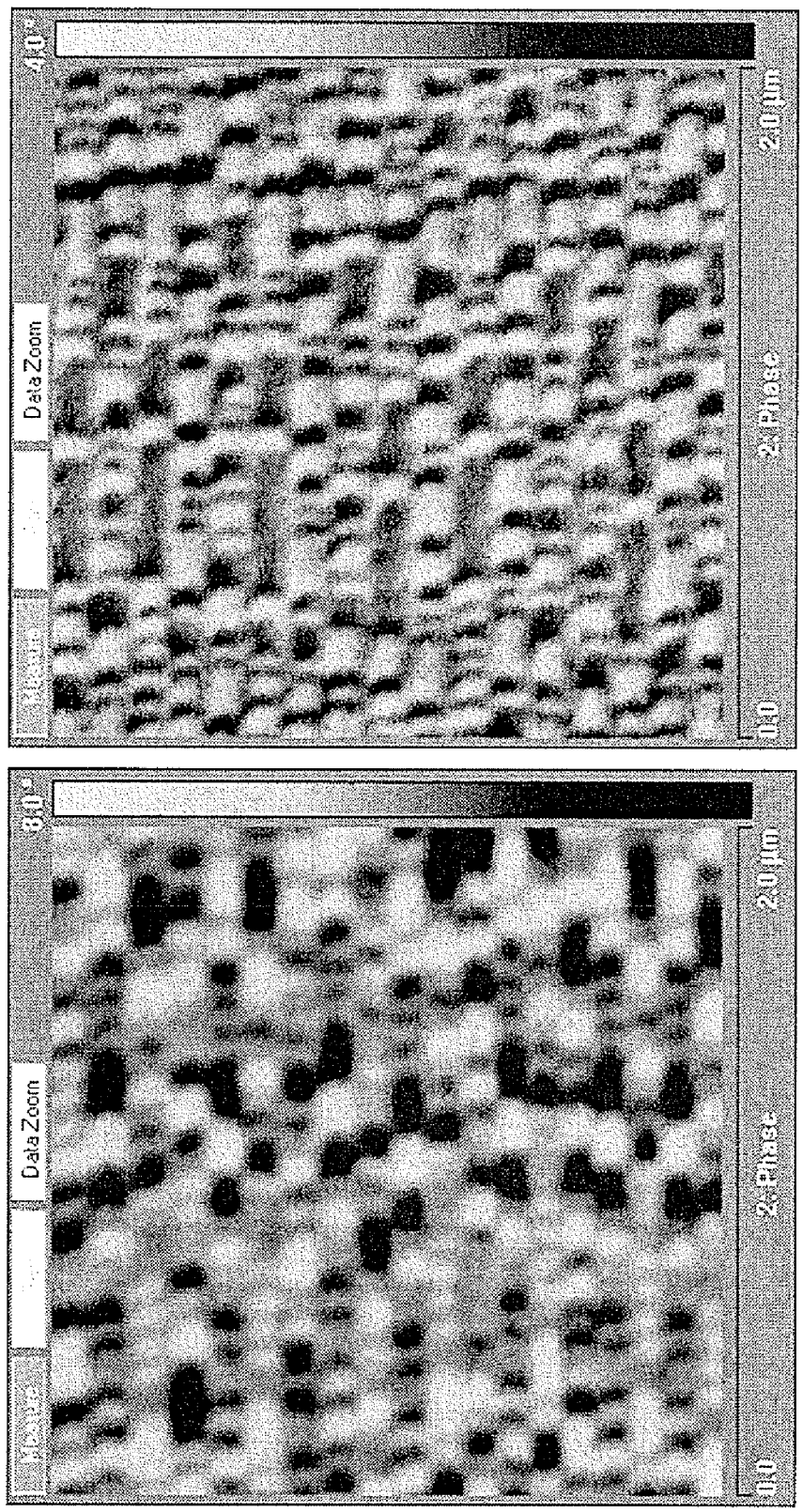
FIGS. 13A-13B are MFM images comparing the performance of a commercial MFM probe to an embodiment of the MFM probe of FIG. 8 in imaging a high-density hard disk drive.

In order to further examine the performance of an embodiment of this MFM probe, another experiment was conducted on a commercially available hard disk drive. For this analysis, a high-density storage drive by Seagate (394 Gbpsi Momentus 5400.6) was examined to highlight the capabilities of the this MFM probe. For this analysis, a composition of FePt(55/45) was deposited for both magnetic layers with the same stack composition and thickness as mentioned above. For comparison, both a commercial MFM probe by NanoSensors and the MFM probe of the present disclosure was used to image the same magnetic disk at similar locations to one other (FIGS. 13A and 13B, respectively). The results clearly reveal that information which is unresolvable by the commercial probes can be seen with the MFM probe disclosed herein.

Example 2

Plateau Formation

FIGS. 14-17 and 18 are SEM micrographs illustrating embodiments of, respectively, circular and triangular plateaus formed according to embodiments of the methods 130 and 150. FIGS. 14A, 15A, 16A, and 17A are perspective and side views of MFM probe tip substrates 202 prior to the first patterning operations of block 134, while FIGS. 14B, 15B, 17B, and 18A are top down views of the MFM probe tip substrates 202 prior to the first patterning operations. The MFM probe tip substrates 202 of FIGS. 14-17 can be observed to have a generally conical appearance, while the MFM probe tip substrate 202 of FIG. 18 can be observed to have a generally pyramidal appearance. In certain embodiments, the MFM probe tip substrate 202 may comprise an AFM probe.

FIGS. 14C-D, 15C-E, 16B-E, 17C-E, and 18B-D illustrate the configuration of the MFM probe tip substrates 202 during the first patterning operations of block 136. For example, the first patterning operation may be performed by FIB milling. In the embodiments of FIGS. 14C, 15C, and 17C, a portion of the lateral edges 612 of the MFM probe tip substrates 202 have been removed, prior to formation of the plateau 604, in order to provide the second portion 602 with a generally cylindrical geometry. In other embodiments, such as those of FIGS. 16B, 18B-D, plateau formation is performed without removing a portion of the lateral edges 612 of the MFM probe tip substrates 202.

Circular plateaus formed in MFM probe tip substrates 202 are illustrated in FIGS. 14D, 15E, 16C-16D, and 17E, while a triangular plateau formed in an MFM probe tip substrate 202 is illustrated in FIG. 18E. The diameter of the illustrated circular plateaus are about 0.6 μm (FIG. 14D), 1.0 μm (FIG. 15E), 2 μm (FIGS. 16C-16D), and 3 μm (FIG. 17E), while the edge length of the triangular plateau is about 1.5 μm (FIG. 18E).

Example 3

Magnetic Material Deposition

FIGS. 19-22 are low and high magnification SEM micrographs of MFM probe tips corresponding to FIGS. 14, 15, 18, and 17, respectively, illustrating the appearance of the probe tips after deposition of magnetic materials. The micrographs of FIGS. 19A-19B illustrate one embodiment of a conical MFM probe tip formed by deposition of a magnetic material 200 comprising Co in a continuous configuration. The micrographs of FIGS. 20A-20B illustrate one embodiment of a conical MFM probe tip formed by deposition of a magnetic material 200 comprising 2 layers of FePt $L1_0$ material in a granular configuration. The micrographs of FIGS. 21A-21B illustrate one embodiment of a pyramidal MFM probe tip formed by deposition of a magnetic material 200 comprising 3 layers of Co/Pd in a granular configuration. The micrographs of FIGS. 22A-22B illustrate one embodiment of a conical MFM probe tip formed by deposition of a magnetic material 200 comprising Co/Pd layers in a granular configuration. The grain structure of the magnetic materials 200 may be further observed in the high magnification micrographs of FIGS. 19B, 20B, 21B, and 22B.

Example 4

Magnetic Material Patterning

Figure 20:
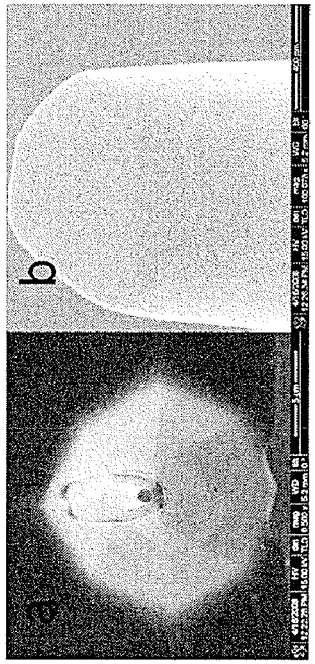
FIGS. 20A-20B are low and high magnification SEM micrographs, respectively, of an embodiment of a conical MFM probe tip formed by deposition of a magnetic layer comprising 2 decoupled layers of FePt $L1_0$ in a continuous configuration.
Figure 22:
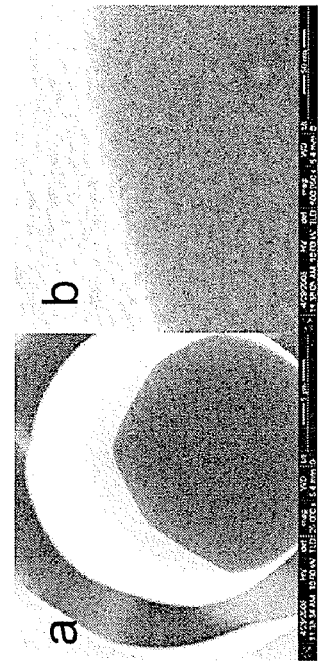
FIGS. 22A-22B are low and high magnification SEM micrographs, respectively, of an embodiment of a conical MFM probe tip formed by deposition of a magnetic layer comprising decoupled layers of Co/Pd in a continuous configuration.
Figure 19:
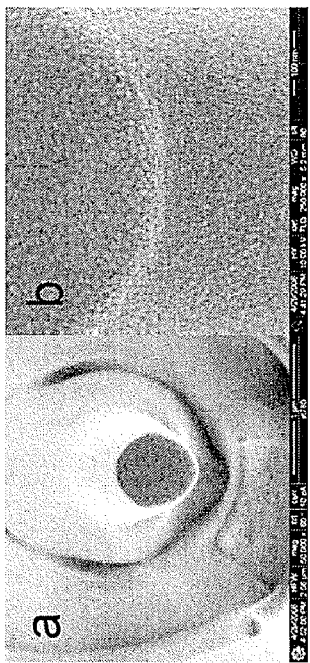
FIGS. 19A-19B are low and high magnification SEM micrographs, respectively, of an embodiment of a conical MFM probe tip formed by deposition of a magnetic layer comprising cobalt (Co) in a substantially continuous configuration.
Figure 21:
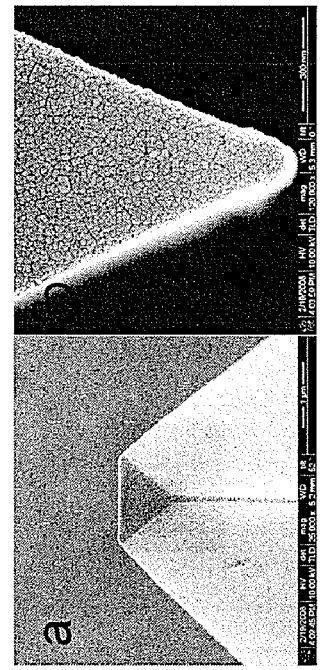
FIGS. 21A-21B are low and high magnification SEM micrographs, respectively, of an embodiment of a pyramidal MFM probe tip formed by deposition of a magnetic layer comprising 3 decoupled layers of Co/Pd in a continuous configuration.
Figure 23B:
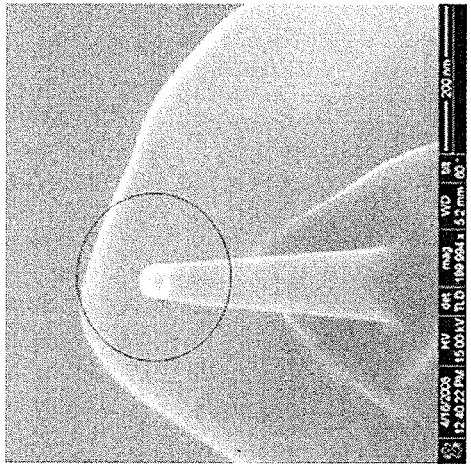
FIGS. 23A-23C are SEM micrographs of embodiments of MFM probe tips corresponding to, respectively, FIGS. 19, 20, and 21 after second patterning operations have been performed.
Figure 23A:
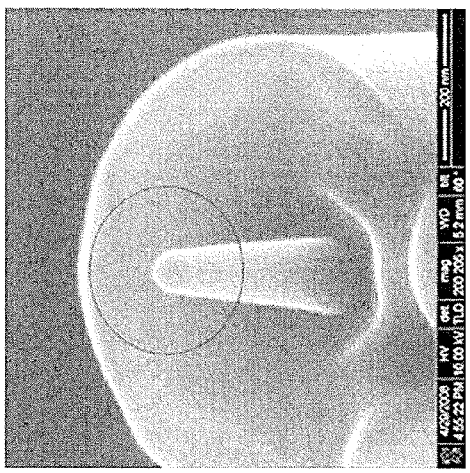
Figure 23C:
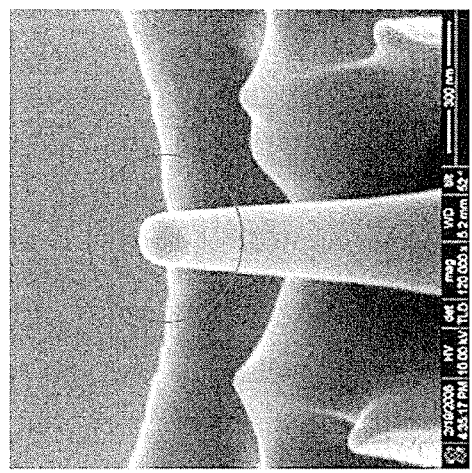

FIGS. 23A-23C are SEM micrographs of MFM probe tips corresponding to, respectively, FIGS. 19, 20, and 21 (Co, FePt, and Co/Pd multilayers) after second patterning operations have been performed on the deposited magnetic materials 200. In each case, the patterned magnetic material 700 (circled) may be observed to be projecting substantially outwards from the adjacent plateau 604. The spatial extent 702 of each of the patterned magnetic material 700 is, respectively, about 55-60 nm, about 40-45 nm, and about 115-120 nm.

Example 5

MFM Probe Tip Performance

In order to examine the performance of embodiments of the MFM probe tips discussed herein, Magnetic Force Microscopy imaging was performed on a magnetic track with linear densities ranging from about 200 to 1200 KFCI. The tracks were recorded on high coercivity perpendicular media and read using an FePt MFM probe tip manufactured according to embodiments of the present disclosure. For comparison, the same tracks were also read by a commercial MFM probe tip (NanoWorld) magnetic material and manufactured by deposition of magnetic materials upon an AFM tip was also measured on the same media.

The FePt MFM probe tip was manufactured in the following manner. With reference to FIGS. 14A-14D, a standard AFM probe, FIGS. 14A-14B, was FIB milled to produce a cylinder of approximately 500 nm in diameter and about 6 μm in length, FIG. 14C. Ion beam current of about 50 pA was initially used to mill the cylinder. The probe was then tilted about 90 degrees in reference to the cylinder's long axis and FIB-milled with an approximately 10 pA beam current to produce a substantially smooth plateau surface FIG. 14D. Since the cantilever holder is tilted by about 10 degrees in reference to the specimen plane, the cylinder was therefore milled at a compensation angle of about 10 degrees in order to insure substantially normal incidence between the apex of the probe and the surface of the specimen. The FIB milling and SEM Imaging were performed using a NOVA 600 Dual-Beam FIB system by FEI.

A composition of Pd (5 nm)/MgO (8 nm)/FePt (10 nm)/ MgO (8 nm) was then sputter deposited on the plateau probe, followed by deposition of a Pd (5 nm) protective layer. The sputtering process was performed using an AJA Orion 5 system, where both Pd and FePt were sputtered deposited using DC power with rates of about 0.35 Å/s and about 0.50 Å/s, respectively. MgO was sputter deposited using RF power with a sputtering rate of about ~0.07 Å/s. The base and processing pressures were $\sim 2 \times 10^7$ Torr and 5 mTorr, respectively. The probe was heated to about 100° C. throughout the whole sputtering process.

Figure 24:
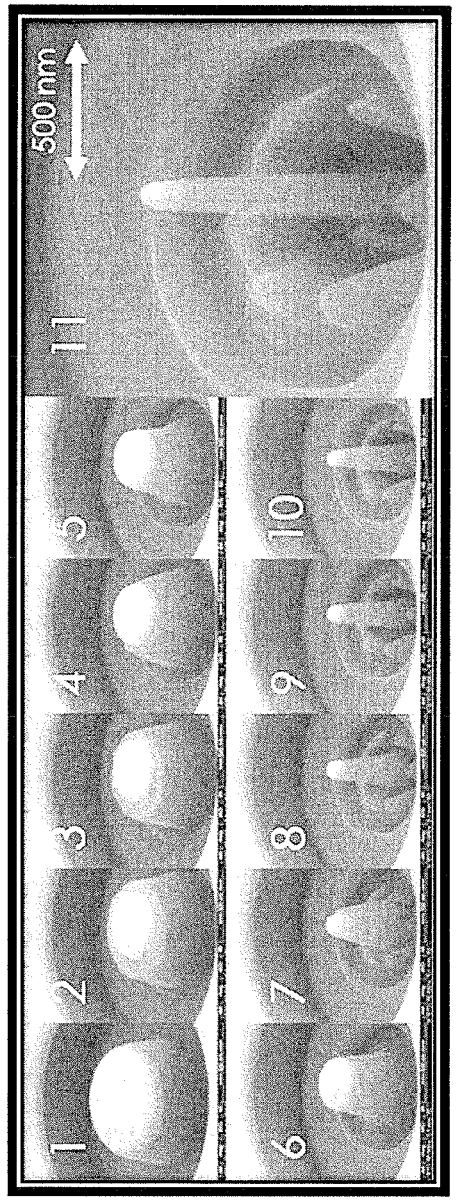
FIG. 24 illustrates a sequence of SEM images (1-11) demonstrating ion beam milling of a plateau feature.
Figure 25:
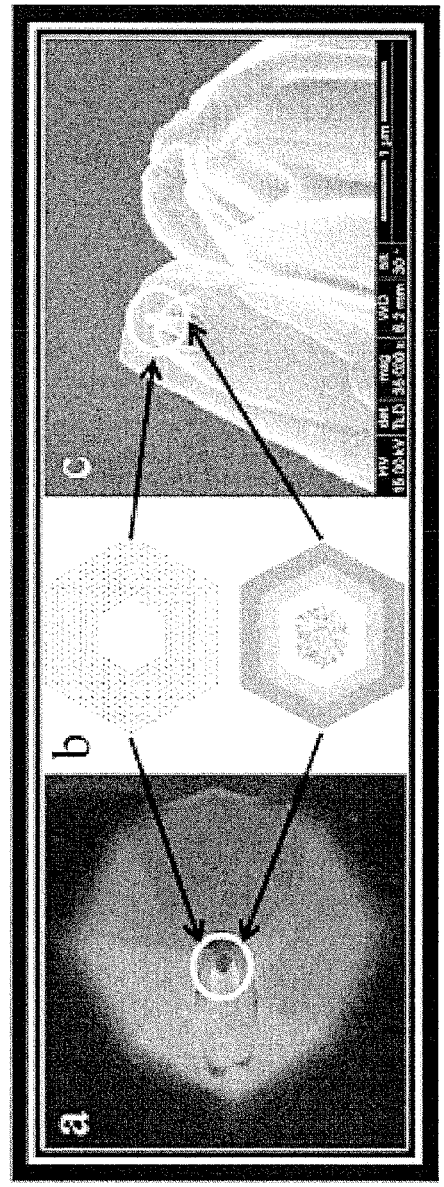
FIGS. 25A-25C are images of a plateau probe and milling path during processing operations; (A) SEM top view of plateau probe after sputter deposition; (B) ion beam milling path; (C) final state of the probe after tip milling.

A MATLAB program was written in order to generate a text file that controlled the ion beam path on pixel-by-pixel bases, forming a hexagonal milling path which traveled in a spiral motion with an outwards-inwards direction. A series of three hexagonal beam paths, each having distinct dimensions and ion dose, were executed to fabricate a tip with an approximately 25 nm curvature radius. FIG. 25B shows the pixel representation of one milling sequence (top), while the figure in the bottom shows the relative ion doses used for each sequence. Hence, the plateau probe was milled from its outer radius with the highest ion dose to its inner radius with the minimum ion dose. FIG. 24 presents a sequence of SEM images that illustrates the FIB milling process. The whole milling process took about 3 minutes, while the last hexagonal sequence tool took less than about 3 seconds. FIG. 25C shows a side view of the final product taken at an approximately 30 degrees angle. The probe was then annealed at 650° C. for about 15 min in a high-vacuum environment.

MFM analysis, with both the FIB-milled FePt probe of an embodiment of the present disclosure and a commercial MFMR probe from NanoWorld, was performed on a CoCrPt-based perpendicular magnetic media. The imaging was performed under ambient conditions in the tapping/lift mode under phase detection. A Dimension 3000 scanning probe microscopy system (Veeco) was used for the MFM scanning.

Figure 26:
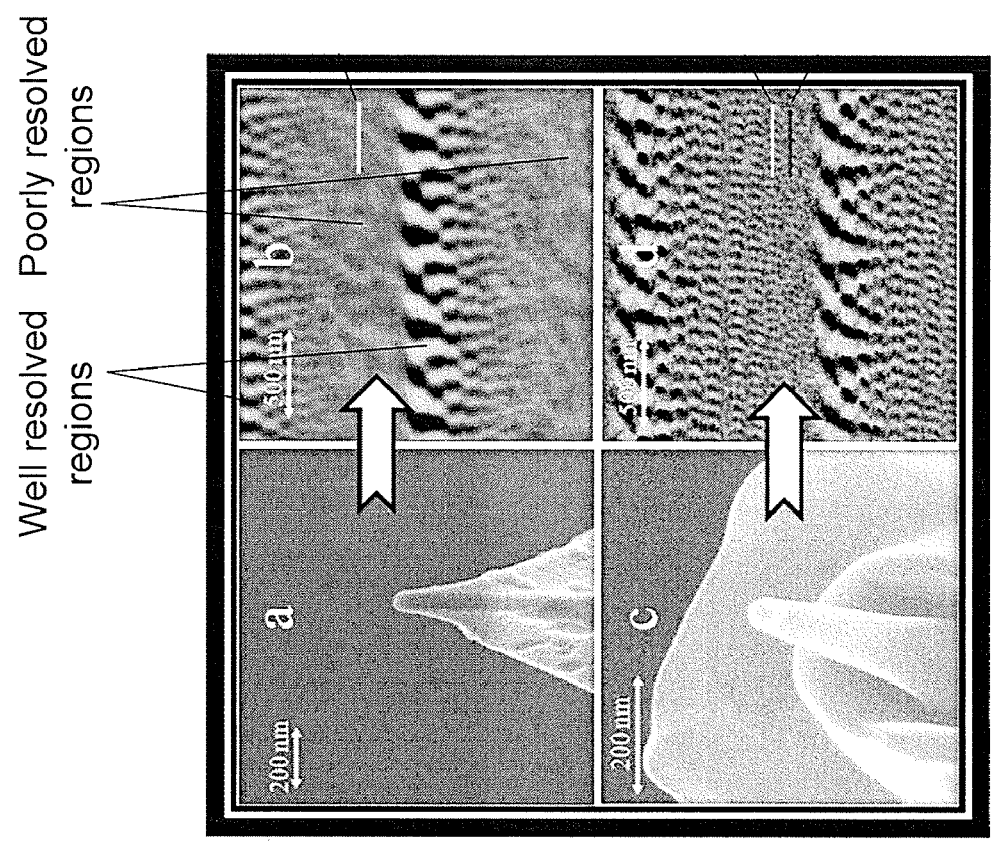
FIGS. 26A-26G are SEM micrographs, MFM images, and MFM line scans corresponding to an embodiment of an MFM probe tip according to the present disclosure and a comparative example.

FIGS. 26A and 26C show SEM images of both the commercial MFMR probe from NanoWorld and the FIB-fabricated FePt probe of an embodiment of the present disclosure. While the commercial probe is complex in shape and is fully covered with magnetic material, the FePt probe has magnetic material just on its apex for which both the thickness and lateral dimensions of the magnetic material can well be approximated. Deconvolution can thus be applied to further enhance the lateral resolution of the acquired MFM image. FIGS. 19B and 19C are approximately $2 \times 2$ $\mu m^2$ MFM images of regions taken from the CoCrPt-based magnetic media with the conventional MFM probe and with the FIB fabricated FePt probe, respectively.

A set of tracks with varying linear densities from 200 to 1200 KFCI were continuously recorded onto the reference ultra-high-density perpendicular magnetic disk for a radial distance of about 30 µm. Hence, if MFM imaging shows blank regions on the recorded area, this would be because the resolution of the probe is not adequate to detect the ultra-high density information recorded in these regions.

It can be seen from FIG. 26B that the conventional probe is not capable of reading all the tracks with relatively high linear densities, i.e. with bit features of smaller than approximately 30 nm. This explains the presence of relatively large fainted regions (with no distinguishable features) where otherwise ultra-high density information could have been detected. In contrast, it can be seen from FIG. 26D the above described FIB-milled FePt probe can substantially distinguish all the tracks recorded into the disk, with bit features at least as small as approximately 17 nm. That is why in the latter case, substantially the entire $2 \times 2 / \mu m^{\times 2}$ region shown in FIG. 26D is covered by tracks.

Figure 26E:
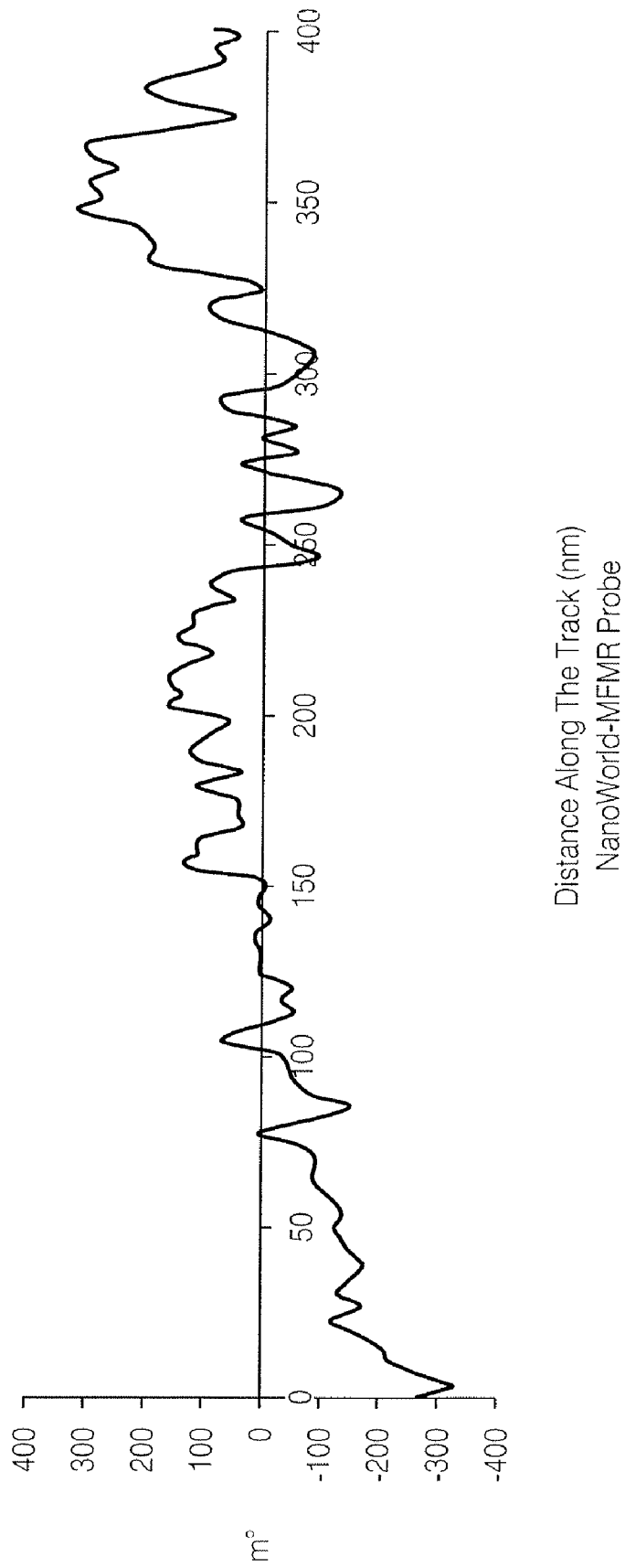
Figure 26F:
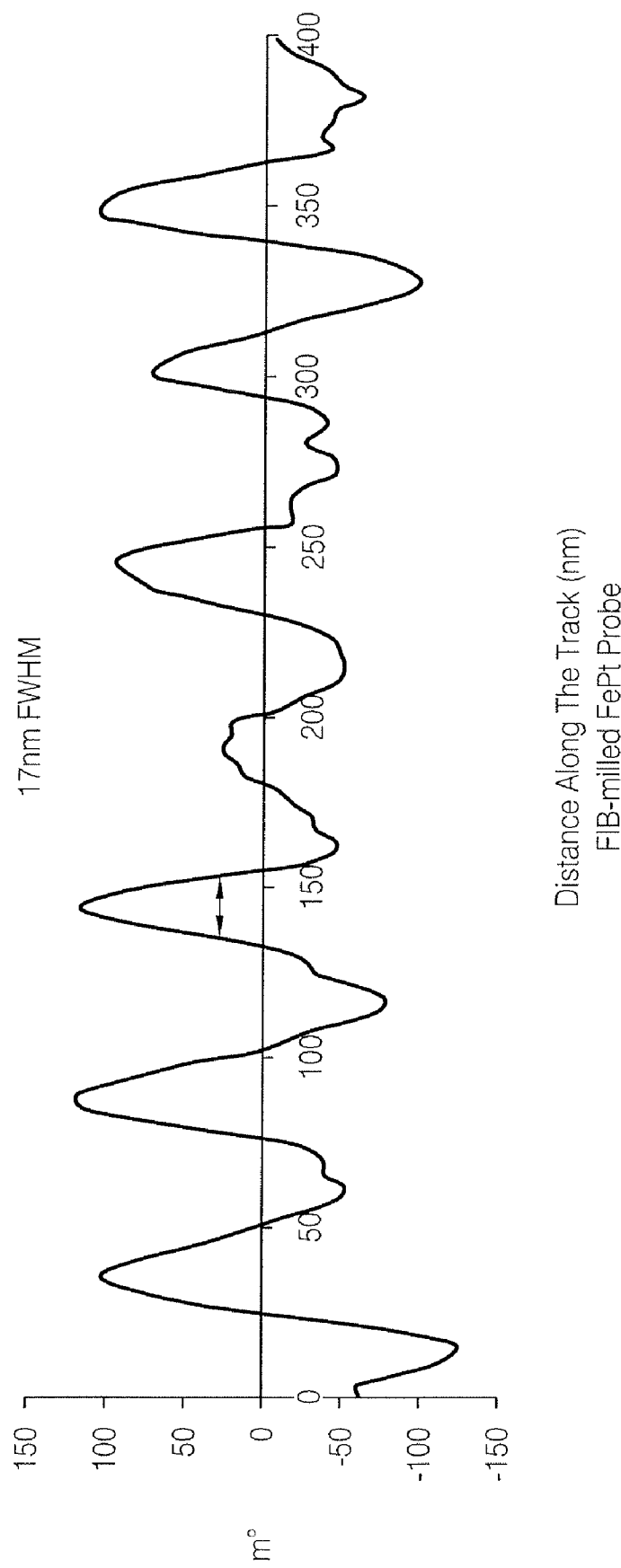
Figure 26G:
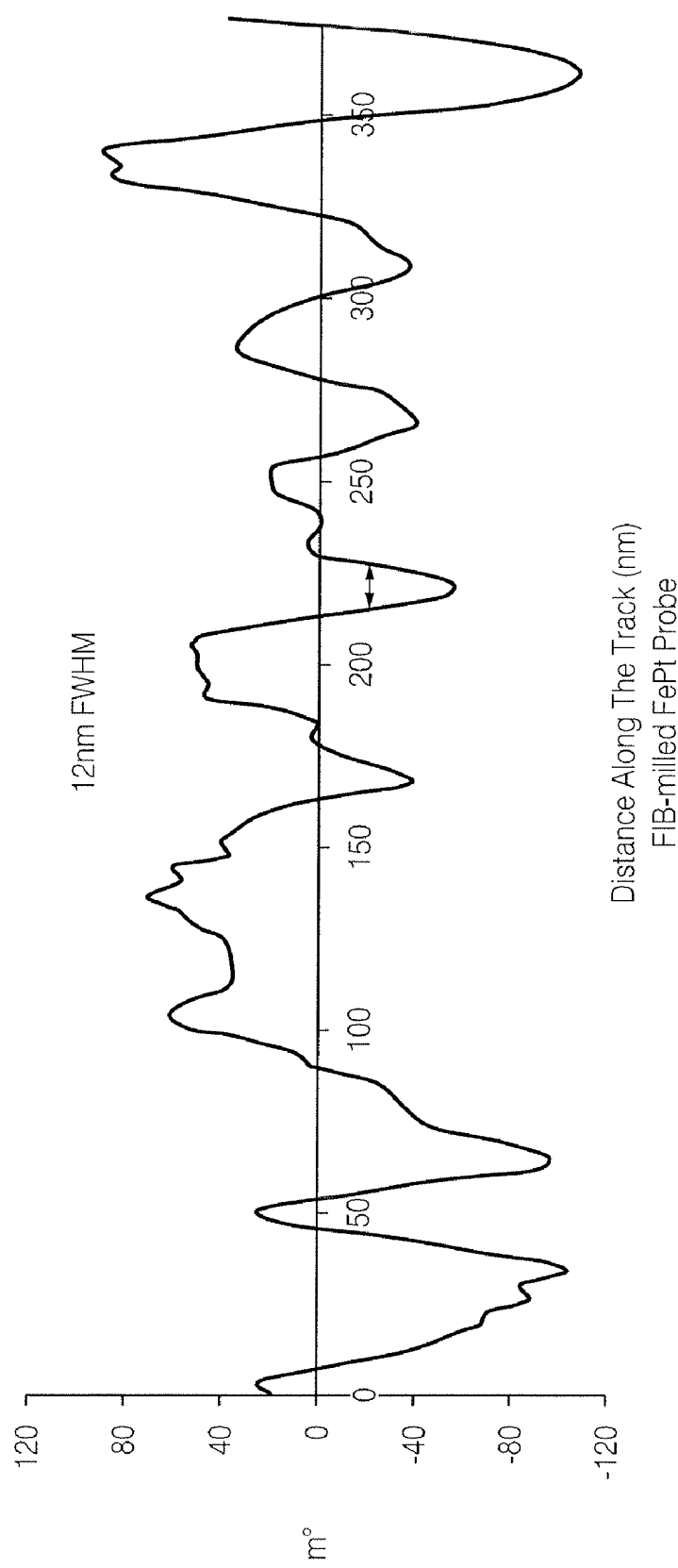

In order to quantify the lateral MFM resolution it is possible to measure the full-width-half-maximum (FWHM) response of a nanomagnetic feature. FIGS. 26E and 26F represent cross-section profiles corresponding to the solid white lines in FIG. 26B and 26D, respectively. The section profiles are taken from tracks with similar linear densities, about 1000 KFCI for adequate resolution comparison. Approximately 17 nm FWHM is recorded for the FIB-fabricated FePt probe, while the commercial MFMR generated a relatively poor image quality with no distinguishable magnetic features. The relative poor resolution of the commercial probe can be attributed to the fact the while the FIB-fabricated probe has magnetic material only on its apex, the commercial probe is fully covered with magnetic material and thus a larger and more complex magnetic field distribution interacts with the magnetization of the media. Furthermore, even at substantially smaller track separation distances, less than approximately 15 mm, the FePt MFM probe tip is still capable of resolving the magnetic tracks, as illustrated in FIG. 26G.

In summary, embodiments of the present disclosure provide methods for the fabrication of MFM probe tips that provide significant enhanced resolutions, as well as MFM probe tips fabricated therefrom. Nanopatterning techniques may be employed to pattern substrates into a plateau configuration suitable for the deposition of magnetic materials thereupon, as well as to pattern the magnetic materials themselves. The patterned plateau configuration of the MFM probe tip, in combination with bulk characterization of the magnetic properties of the magnetic materials deposited upon the probe tip, enables the magnetic properties of the probe tip to be well characterized, and significantly enhance the resolution of the MFM probe tips. For example, probe tips capable of resolving sub-10 nm features, in ambient environments, may be fabricated.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of manufacturing a magnetic force microscopy (MFM) probe tip, comprising:
    introducing a plateau region into a first end of a generally elongate substrate in a first plurality of patterning operations;
    depositing a magnetic material comprising a plurality of magnetic layers that are exchanged decoupled from one another upon at least a portion of the plateau region of the MFM probe tip substrate; and patterning the magnetic material in a second plurality of patterning operations.

2. The method of claim 1, wherein the substrate is mounted to a cantilever and wherein the substrate comprises one of silicon, silicon oxide, and silicon nitride.

3. The MFM probe tip of claim 1, wherein the MFM probe tip substrate comprises one of a cone, a cylinder, and a pyramid.

4. The method of claim 1, wherein the magnetic material further comprises an adhesion layer, wherein the adhesion layer comprises one of titanium (Ti), tantalum (Ta), chromium (Cr), and palladium (Pa).

5. The method of claim 1, wherein the magnetic material further comprises a seed layer comprising one of Ruthenium (Ru), Chromium (Cr), Palladium (Pd), Platinum (Pt), Silver (Ag), and Magnesium Oxide (MgO).

6. The method of claim 1, wherein the magnetic material further comprises a plurality of magnetic layers and a plurality of non-magnetic layers interposed between at least one pair of the plurality of magnetic layers.

7. The method of claim 6, wherein the non-magnetic layer comprise at least one of MgO, CrRu, Ti, Ta, Pd, and Pt.

8. The method of claim 6, wherein the magnetic layers comprise substantially continuous magnetic layers.

9. The method of claim 8, wherein the continuous magnetic layers comprise at least one of cobalt (Co), iron (Fe), nickel (Ni), cobalt/palladium (Co/Pd) multilayers, cobalt/platinum (Co/Pt) multilayers, iron/platinum (Fe/Pt) multilayers, iron/palladium (Fe/Pd) multilayers and $L1_0$ alloy compositions of cobalt-palladium (CoPd), cobalt-platinum (CoPt), iron-platinum (FePt) and iron-palladium (FePd).

10. The method of claim 6, wherein the magnetic layers comprise granular magnetic layers.

11. The method of claim 10, wherein at least one of the magnetic layers comprises a composition given by one of CoCrX and $L1_0$ FePtX, FePdX CoPdX, CoPtX, where X comprises Cu, Ag, Au, Pd, Pt, Cr, B, C, $SiO_2$, $TiO_2$.

12. The method of claim 1, wherein the magnetic material further comprises a protective layer comprising one of Carbon (C), Palladium (Pd), Platinum (Pt), Titanium (Ti), Tantalum (Ta), Palladium (Pd), Gold (Au), Silver (Ag), and Chromium (Cr).

13. The method of claim 1, wherein the patterning operations are performed by focused ion beam milling, chemical etching, and combinations thereof.

14. The method of claim 1, wherein the second patterning operation reduces the spatial extent of the plateau.

15. The method of claim 1, wherein the second plurality of patterning operations comprises:
depositing an adhesion layer on the magnetic material;
depositing a hard mask on the adhesion layer;
patterning the hard mask by focused ion beam milling;
patterning the remaining underlying magnetic material by argon ion milling.

16. The method of claim 15, wherein the hard mask comprises magnesium oxide (MgO), aluminum oxide ($Al_2O_3$) silicon nitride ($Si_3N_4$), Indium Tin Oxide (ITO), Carbon (C), and combinations thereof.

17. A magnetic force microscopy (MFM) probe tip, comprising:
a generally elongate body having a first end and a second end, the second end having a plateau configuration with respect to the body; and
a magnetic material positioned upon the plateau at the second end of the body, wherein the magnetic material comprises a plurality of magnetic layers and at least one non-magnetic layer interposed between at least one pair of the plurality of magnetic layers and wherein the at least one non-magnetic layer inhibits magnetic exchange coupling between the at least one pair of the plurality of magnetic layers.

18. The method of claim 17, wherein the substrate is mounted to a cantilever and wherein the substrate comprises one of silicon, silicon oxide, and silicon nitride.

19. The MFM probe tip of claim 17, wherein the MFM probe tip substrate comprises one of a cone, a cylinder, and a pyramid.

20. The method of claim 17, wherein the magnetic material further comprises an adhesion layer, wherein the adhesion layer comprises one of titanium (Ti), tantalum (Ta), chromium (Cr), and palladium (Pa).

21. The MFM probe tip of claim 17, wherein the magnetic material further comprises a seed layer comprising one of Ruthenium (Ru), Chromium (Cr), Palladium (Pd), Platinum (Pt), Silver (Ag), and Magnesium Oxide (MgO).

22. The MFM probe tip of claim 17, wherein the magnetic material further comprises a plurality of magnetic layers and a non-magnetic layer interposed between at least one pair of the plurality of magnetic layers.

23. The MFM probe tip of claim 22, wherein the non-magnetic layers comprise at least one of MgO, CrRu, Ti, Ta, Pd, and Pt.

24. The MFM probe tip of claim 17, wherein the magnetic layers comprise substantially continuous magnetic layers.

25. The MFM probe tip of claim 24, wherein the continuous magnetic layers comprise at least one of cobalt (Co), iron (Fe), nickel (Ni), cobalt/palladium (Co/Pd) multilayers, cobalt/platinum (Co/Pt) multilayers, iron/platinum (Fe/Pt) multilayers, iron/palladium (Fe/Pd) multilayers and $L1_0$ alloy compositions of cobalt-palladium (CoPd), cobalt-platinum (CoPt), iron-platinum (FePt) and iron-palladium (FePd).

26. The MFM probe tip of claim 17, wherein the magnetic layers comprise granular magnetic layers.

27. The MFM probe tip of claim 26, wherein at least one of the magnetic layers comprises a composition given by one of CoCrX and $L1_0$ FePtX, FePdX CoPdX, CoPtX, where X comprises Cu, Ag, Au, Pd, Pt, Cr, B, C, SiO2, $TiO_2$.

28. The method of claim 17, wherein the magnetic material further comprises a protective layer comprising one of Carbon (C), Palladium (Pd), Platinum (Pt), Titanium (Ti), Tantalum (Ta), Palladium (Pd), Gold (Au), Silver (Ag), and Chromium (Cr).

29. A magnetic force microscopy (MFM) probe tip, comprising:
a substrate comprising an atomic force microscopy (AFM) tip; and
a magnetic material positioned upon at least a portion of the substrate, the magnetic material comprising at least two magnetic layers and at least one non-magnetic layer interposed between at least one pair of the plurality of magnetic layers, wherein the at least one non-magnetic interlayer is configured to inhibit exchange coupling between the at least two magnetic layers;
wherein the magnetic flux in the at least two magnetic layers is configured so as to substantially cancel except within an active magnetic region having a selected dimension.

30. The MFM probe tip of claim 29, wherein the selected dimension is less than about 10 nm.

31. The method of claim 29, wherein the magnetic material further comprises an adhesion layer, wherein the adhesion layer comprises one of Ti, Cr, and Ta.

32. The method of claim 29, wherein the magnetic material further comprises a seed layer comprising one of Ruthenium (Ru), Chromium (Cr), Palladium (Pd), Platinum (Pt), Silver (Ag), and Magnesium Oxide (MgO).

33. The method of claim 29, wherein the magnetic material further comprises a plurality of magnetic layers and a non-magnetic layer interposed between at least one pair of the plurality of magnetic layers.

34. The method of claim 33, wherein the non-magnetic layers comprise at least one of MgO, CrRu, Ti, Ta, Pd, and Pt.

35. The method of claim 29, wherein the magnetic layers comprise substantially continuous magnetic layers.

36. The method of claim 35, wherein the continuous magnetic layers comprise at least one of cobalt (Co), iron (Fe), nickel (Ni), cobalt/palladium (Co/Pd) multilayers, cobalt/platinum (Co/Pt) multilayers, iron/platinum (Fe/Pt) multilayers, iron/palladium (Fe/Pd) multilayers and $L1_0$ alloy compositions of cobalt-palladium (CoPd), cobalt-platinum (CoPt), iron-platinum (FePt) and iron-palladium (FePd).

37. The method of claim 29, wherein the magnetic layers comprise granular magnetic layers.

38. The method of claim 37, wherein at least one of the magnetic layers comprises a composition given by one of CoCrX and $L1_0$ FePtX, FePdX CoPdX, CoPtX, where X comprises Cu, Ag, Au, Pd, Pt, Cr, B, C, SiO2, $TiO_2$.

39. The method of claim 29, wherein the magnetic material further comprises a protective layer comprising one of Carbon (C), Palladium (Pd), Platinum (Pt), Titanium (Ti), Tantalum (Ta), Palladium (Pd), Gold (Au), Silver (Ag), and Chromium (Cr).

* * * * *